(12) United States Patent
Kanda et al.

(10) Patent No.: US 10,127,481 B2
(45) Date of Patent: Nov. 13, 2018

(54) IMAGE PROCESSING APPARATUS AND IMAGE PROCESSING METHOD

(71) Applicant: CANON KABUSHIKI KAISHA, Tokyo (JP)

(72) Inventors: Hidehiko Kanda, Yokohama (JP); Yutaka Kano, Kawasaki (JP); Eiji Komamiya, Kawasaki (JP); Takeshi Yazawa, Yokohama (JP); Ayako Ohta, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/163,084

(22) Filed: May 24, 2016

(65) Prior Publication Data

US 2016/0350627 A1    Dec. 1, 2016

(30) Foreign Application Priority Data

May 27, 2015  (JP) ................ 2015-107877

(51) Int. Cl.
*B41J 2/21*   (2006.01)
*G06K 15/10*  (2006.01)
*G06K 15/02*  (2006.01)

(52) U.S. Cl.
CPC .......... *G06K 15/107* (2013.01); *B41J 2/2132* (2013.01); *G06K 15/1836* (2013.01); *G06K 15/1843* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,390,583 B1* | 5/2002 | Kato | ............ | H04N 1/4015 347/15 |
| 7,261,388 B2* | 8/2007 | Vega | ............ | G06K 15/107 347/13 |
| 7,706,023 B2* | 4/2010 | Kanda | ............ | G06F 3/1212 358/1.9 |
| 7,980,652 B2* | 7/2011 | Baba | ............ | B41J 29/393 347/19 |
| 8,622,501 B2* | 1/2014 | Komamiya | ............ | B41J 2/2132 347/14 |
| 8,786,896 B2* | 7/2014 | Marumoto | ............ | G06K 15/107 358/1.2 |
| 9,108,403 B2* | 8/2015 | Kawatoko | ............ | B41J 2/2121 |
| 9,211,748 B2* | 12/2015 | Baba | ............ | B41J 29/393 |
| 9,498,961 B2* | 11/2016 | Kano | ............ | B41J 2/16526 |

(Continued)

FOREIGN PATENT DOCUMENTS

CN  101595734 A  12/2009
EP  0814601 A2   12/1997
(Continued)

*Primary Examiner* — Matthew Luu
*Assistant Examiner* — Lily Kemathe
(74) *Attorney, Agent, or Firm* — Canon U.S.A., Inc. IP Division

(57) ABSTRACT

With respect to an area quantized by using an area of part in a quantization pattern and also without using an area of the other part in the quantization pattern in quantized data, a mask pattern part corresponding to the area of the part among mask pattern parts constituted by dividing a mask pattern is applied.

20 Claims, 23 Drawing Sheets

(56) References Cited

U.S. PATENT DOCUMENTS

| | | | |
|---|---|---|---|
| 9,636,906 B2* | 5/2017 | Kawatoko | B41J 2/04505 |
| 9,649,853 B2* | 5/2017 | Baba | B41J 2/2132 |
| 2005/0018012 A1* | 1/2005 | Iwasaki | B41J 19/147 347/43 |
| 2006/0044338 A1* | 3/2006 | Maru | G06K 15/107 347/15 |
| 2007/0236745 A1 | 10/2007 | Noguchi et al. | |
| 2010/0118318 A1* | 5/2010 | Fuse | B41J 2/2132 358/1.8 |
| 2011/0122178 A1* | 5/2011 | Goto | B41J 2/2132 347/9 |
| 2011/0199413 A1* | 8/2011 | Baba | B41J 29/393 347/14 |
| 2011/0234661 A1* | 9/2011 | Goto | B41J 2/2132 347/9 |
| 2011/0316911 A1* | 12/2011 | Ishikawa | G06K 15/107 347/9 |
| 2012/0274951 A1* | 11/2012 | Nishikori | G06K 15/102 358/1.2 |
| 2012/0287193 A1* | 11/2012 | Suzuki | B41J 2/2125 347/15 |
| 2012/0287194 A1* | 11/2012 | Masuda | B41J 2/195 347/15 |
| 2013/0120769 A1* | 5/2013 | Kakutani | G06K 15/10 358/1.8 |
| 2014/0104335 A1* | 4/2014 | Kawatoko | B41J 2/2121 347/9 |
| 2015/0273820 A1* | 10/2015 | Nakajima | B41J 11/0085 347/14 |

FOREIGN PATENT DOCUMENTS

| | | |
|---|---|---|
| EP | 1331804 A2 | 7/2003 |
| JP | 2008-067049 A | 3/2008 |
| JP | 2009-039944 A | 2/2009 |

* cited by examiner

FIG. 1A
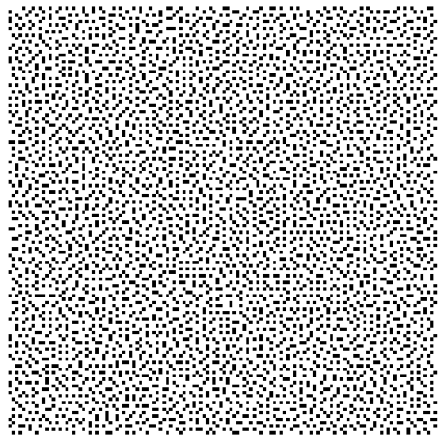
FIG. 1B1
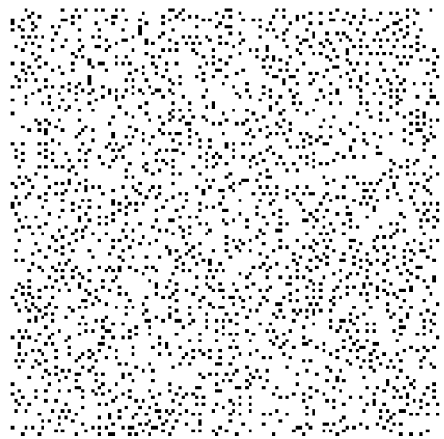
FIG. 1B2
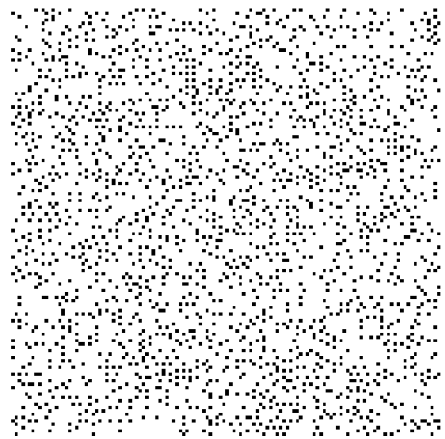
FIG. 1C1
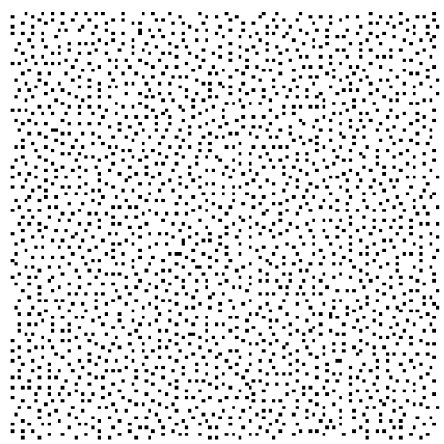
FIG. 1C2
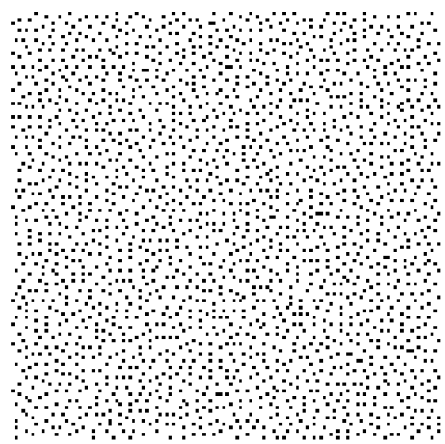

FIG. 8A1 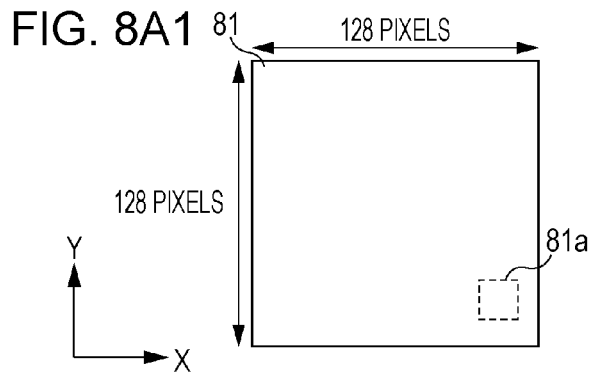 FIG. 8A2 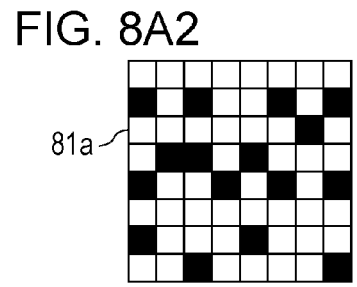
FIG. 8B1 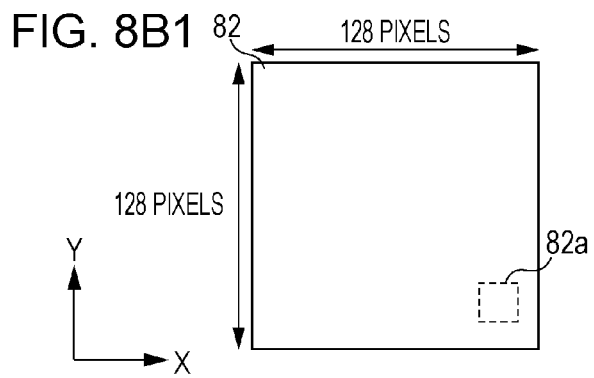 FIG. 8B2 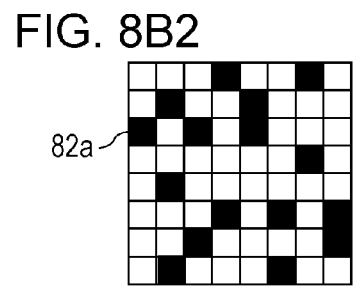
FIG. 8C1 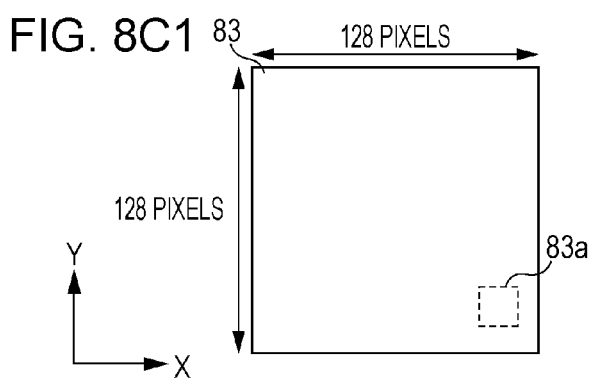 FIG. 8C2 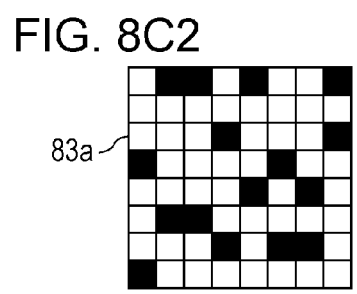
FIG. 8D1 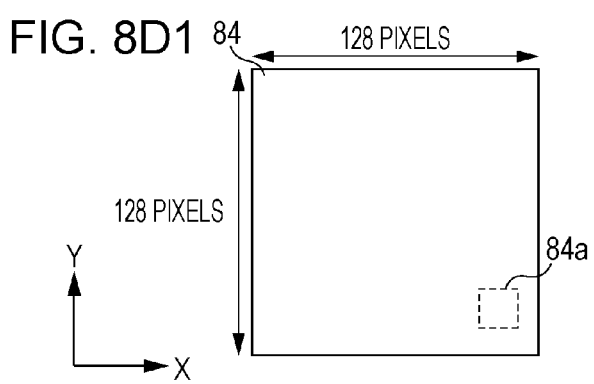 FIG. 8D2 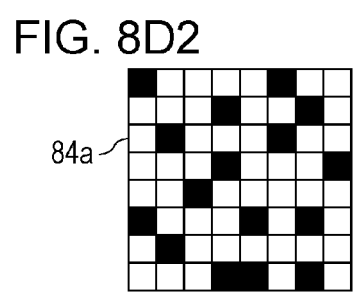

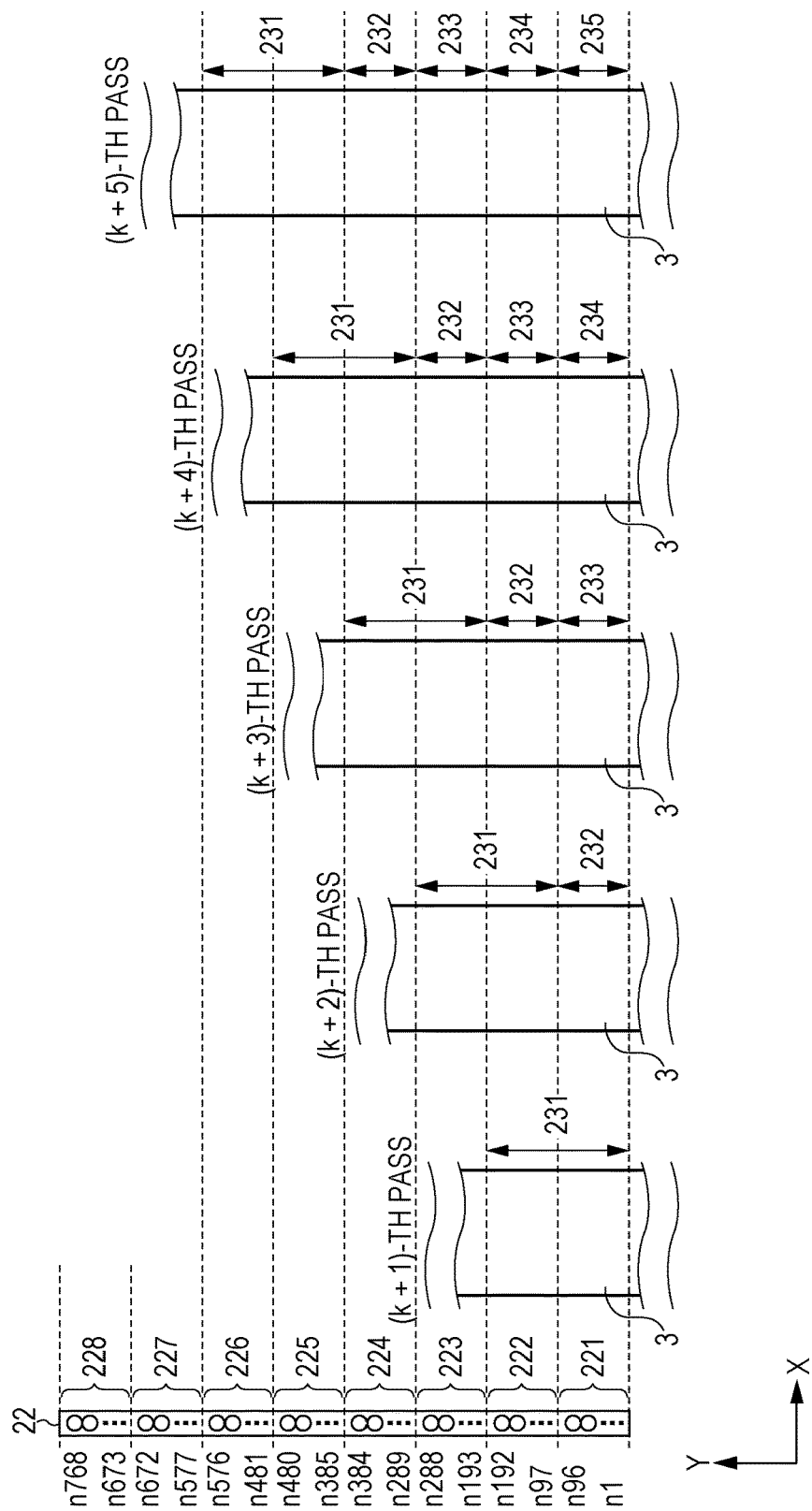

FIG. 18

| GRAYSCALE VALUE In OF MULTI-VALUE DATA | QUOTIENT N | REMINDER In' |
|---|---|---|
| 0 | 0 | 0 |
| 1 | | 1 |
| 2 | | 2 |
| 3 | | 3 |
| ⋮ | | ⋮ |
| 82 | | 82 |
| 83 | | 83 |
| 84 | | 84 |
| 85 | 1 | 0 |
| 86 | | 1 |
| 87 | | 2 |
| 88 | | 3 |
| ⋮ | | ⋮ |
| 167 | | 82 |
| 168 | | 83 |
| 169 | | 84 |
| 170 | 2 | 0 |
| 171 | | 1 |
| 172 | | 2 |
| 173 | | 3 |
| ⋮ | | ⋮ |
| 252 | | 82 |
| 253 | | 83 |
| 254 | | 84 |
| 255 | 3 | 0 |

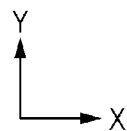

FIG. 22

|  |  | CODE VALUE OF MASK PATTERN | | | |
| --- | --- | --- | --- | --- | --- |
|  |  | 00 | 01 | 10 | 11 |
| PIXEL VALUE OF IMAGE DATA | 00 | × | × | × | × |
|  | 01 | × | × | × | ○ |
|  | 10 | × | × | ○ | ○ |
|  | 11 | × | ○ | ○ | ○ |

○ : RECORDING
× : NON-RECORDING

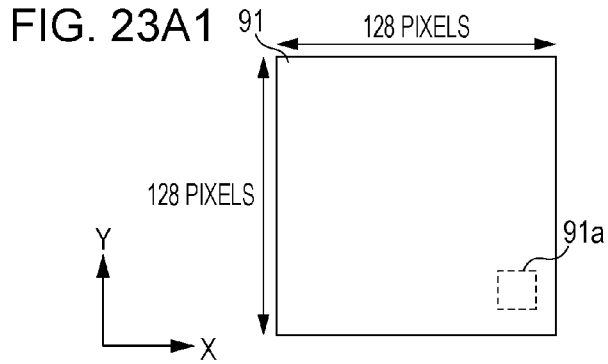
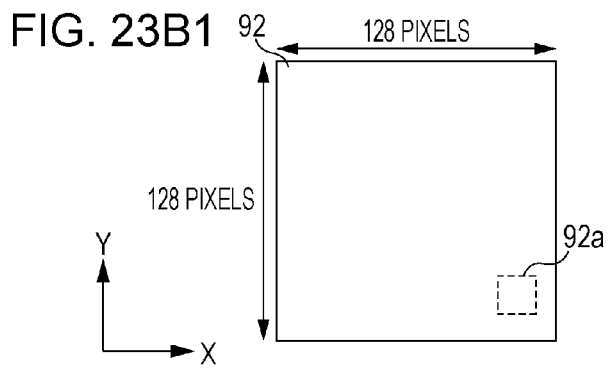
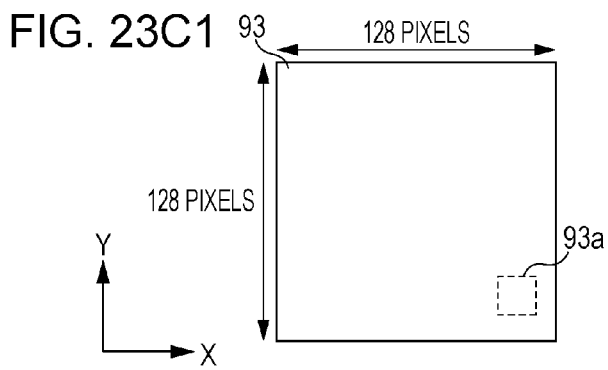
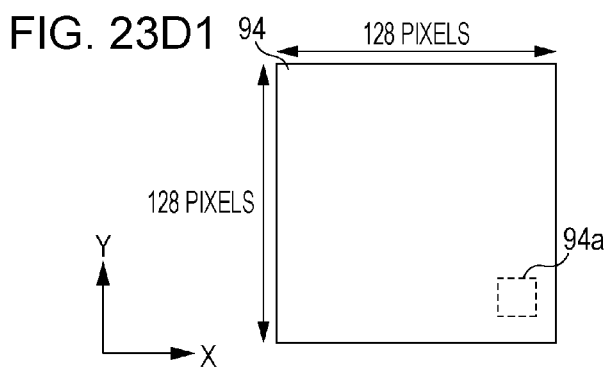

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

An image recording apparatus configured to record an image by repeatedly performing recording scanning and sub scanning has been proposed. In the recording scanning, ink is ejected while a recording head including an ejection opening column where a plurality of ejection openings for ejecting the ink are arranged is moved relatively with respect to a unit area of a recording medium. In the sub scanning, the recording medium is conveyed. In the above-described image recording apparatus, a so-called multipass recording method has been proposed in which the recording scanning with respect to the unit area is performed plural times to form the image.

According to the above-described multipass recording method, in general, multi-value data corresponding to the image to be recorded is quantized to generate quantized data, and furthermore, the quantized data is distributed to a plurality of scanning operations to generate recording data used for the recording. It has been disclosed that a quantization pattern is used when quantization processing is performed, and a plurality of mask patterns corresponding the plurality of scanning operations are used when distribution processing is performed.

Japanese Patent Laid-Open No. 2009-39944 discloses that the quantization processing is performed by adopting the quantization pattern in accordance with an amount of single conveyance of the recording medium in a case where the above-described quantization pattern and mask patterns are used. According to Japanese Patent Laid-Open No. 2009-39944, it is described that a plurality of quantization patterns in which the conveyance amount corresponds to an integer multiple of a width in an array direction of the ejection openings of the quantization pattern are prepared for each conveyance amount, and different quantization patterns are adopted in accordance with the conveyance amounts, so that it is possible to suppress an image quality degradation of the obtained image.

Herein, in a case where the above-described quantization pattern and mask pattern are used, a spatial deviation may occur in the image based on the generated recording data in some cases if the respective patterns are determined in an uncorrelated manner. To reduce the above-described deviation, the quantization pattern and the mask pattern need to be determined while being associated with each other.

FIGS. 1A, 1B1, 1B2, 1C1, and 1C2 illustrate an example of recording data generated in a case where the quantization pattern and the mask pattern are determined in an uncorrelated manner and a case where the quantization pattern and the mask pattern are determined while being associated with each other. It should be noted that a case where the quantization pattern and the mask pattern each have the size of 128 pixels×128 pixels is illustrated as an example herein. In addition, a case where binary processing is executed is illustrated as an example of quantization.

FIG. 1A illustrates an image based on quantized data having a recording duty at 25% when quantization is performed by using a certain dither pattern. FIGS. 1B1 and 1B2 respectively illustrate recording data for the first scanning and the second scanning in which the quantized data illustrated in FIG. 1A is distributed by using respective mask patterns for the first scanning and the second scanning determined in an uncorrelated manner with respect to a quantization pattern. FIGS. 1C1 and 1C2 respectively illustrate recording data for the first scanning and the second scanning in which the quantized data illustrated in FIG. 1A is distributed by using the respective mask patterns for the first scanning and the second scanning determined while being associated with the quantization pattern. It should be noted that the association herein is an association taking into account a dispersibility in each scanning operation in the association between a threshold of the quantization pattern and a value of the mask pattern.

As may be understood from FIGS. 1B1 and 1B2, in a case where the quantization pattern and the mask pattern are mutually determined in an uncorrelated manner, the spatial deviation may occur in the recording data in some cases. In contrast to this, as illustrated in FIGS. 1C1 and 1C2, it is possible to generate the recording data in which the spatial deviation of the recording data is suppressed by using the quantization pattern and the mask pattern which are determined while being associated with each other.

In contrast to this, according to the technology described in Japanese Patent Laid-Open No. 2009-39944, the quantization pattern needs to be set in accordance with the conveyance amount of the recording medium. Therefore, a degree of freedom in setting of the quantization pattern is degraded.

SUMMARY OF THE INVENTION

The present invention has been made in view of the above. Embodiments of the invention include generating recording data by using a quantization pattern and a mask pattern which are associated with each other without degrading a degree of freedom in setting of a quantization pattern.

In view of the above, according to an aspect of the present invention, there is provided an image processing apparatus for generating recording data used for each of a plurality of relative scanning operations of a recording head in an intersecting direction that intersects with a predetermined direction with respect to a unit area on a recording medium, the recording head including an ejection opening column having a plurality of ejection openings for ejecting ink arranged in the predetermined direction, the recording data corresponding to each of the plurality of scanning operations, the image processing apparatus including an obtaining unit configured to obtain multi-value data corresponding to an image recoded in the unit area, a quantization unit configured to generate quantized data by quantizing the multi-value data obtained by the obtaining unit by using a quantization pattern corresponding to a predetermined area on the recording medium, and a distribution unit configured to generate the recording data by distributing the quantized data generated by the quantization unit to each of the plurality of scanning operations by using a plurality of mask patterns corresponding to the plurality of scanning operations, the quantization pattern and each of the plurality of mask patterns being determined while being mutually associated with each other, and each of the plurality of mask patterns being constituted by a plurality of mask pattern parts each having a width in the predetermined direction smaller than that of the mask pattern, in which the distribution unit applies, to an area quantized by using an area of part in the quantization pattern and also without using an area of the other part in the quantization pattern in the quantized data generated by the quantization unit, each of a plurality of mask pattern parts corresponding to the area of the part.

Further features of the present invention will become apparent from the following description of exemplary embodiments with reference to the attached drawings.

BRIEF DESCRIPTION OF THE DRAWINGS

FIGS. 1A, 1B1, 1B2, 1C1, and 1C2 are schematic diagrams for describing a spatial deviation of recording data.

FIG. 2 is a perspective view of an image recording apparatus applied to an exemplary embodiment.

FIGS. 8A1, 8A2, 8B1, 8B2, 8C1, 8C2, 8D1, and 8D2 are schematic diagrams illustrating mask patterns according to the exemplary embodiment.

FIG. 11 is an explanatory diagram for describing the multipass recording method according to the exemplary embodiment.

FIG. 18 is an explanatory diagram for describing the quantization processing according to the exemplary embodiment.

FIGS. 21A, 21B, 21C1, 21C2, 21C3, 21C4, 21D1, 21D2, 21D3, 21D4, and 21E are explanatory diagrams for describing distribution processing according to the exemplary embodiment.

FIG. 22 is an explanatory diagram for describing the distribution processing according to the exemplary embodiment.

FIGS. 23A1, 23A2, 23B1, 23B2, 23C1, 23C2, 23D1, and 23D2 are schematic diagrams illustrating the mask pattern according to the exemplary embodiment.

DESCRIPTION OF THE EMBODIMENTS

Figure 2:
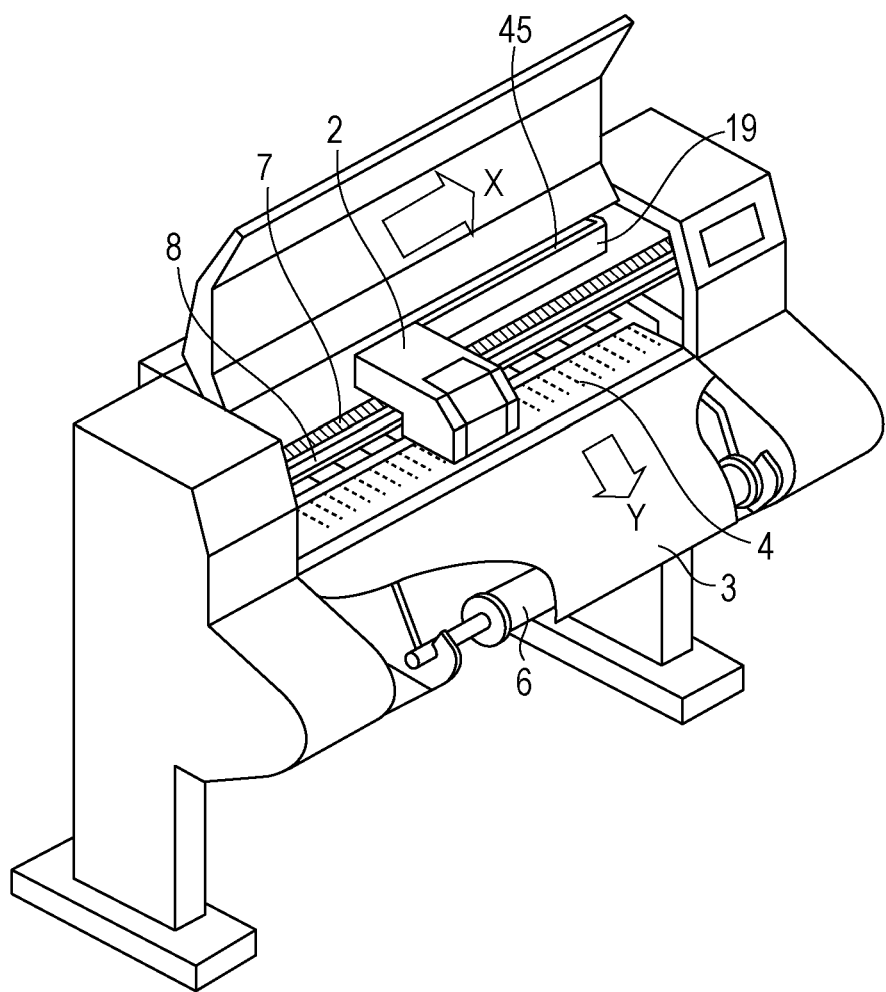

Hereinafter, a first exemplary embodiment of the present invention will be described in detail with reference to the drawings.

First Exemplary Embodiment

FIGS. 1A, 1B1, 1B2, 1C1, and 1C2 illustrate an external appearance of an inkjet recording apparatus according to the present exemplary embodiment (hereinafter, will be also referred to as a printer). This printer is a so-called serial scanning type printer and records an image by relatively scanning a recording head in an intersecting direction (X direction) orthogonal to a conveyance direction (Y direction) of a recording medium 3.

With reference to FIGS. 1A, 1B1, 1B2, 1C1, and 1C2, a configuration of this inkjet recording apparatus and an outline of an operation at the time of the recording will be described. The recording medium 3 is conveyed from a spool 6 that holds the recording medium 3 by a conveyance roller that is not illustrated in the drawing via a gear in the Y direction. On the other hand, a carriage unit 2 is caused to perform the scanning by a carriage motor that is not illustrated in the drawing in a predetermined conveyance position along a guide shaft 8 extending in the X direction. Subsequently, an ejection operation from an ejection opening of the recording head (which will be described below) that can be mounted to the carriage unit 2 is performed at a timing based on a positional signal obtained by an encoder in the process of this scanning 7, and a constant band width corresponding to an array range of the ejection opening is recorded. According to the present exemplary embodiment, a configuration is adopted in which the scanning is performed at a scanning speed of 40 inch per second, and the ejection operation is performed at a resolution of 600 dpi ($\frac{1}{600}$ inch). A configuration is adopted in which the recording medium 3 is thereafter conveyed, and the recording with regard to the next band width is further performed.

It should be noted that a carriage belt can be used for transmission of driving force from the carriage motor to the carriage unit 2. However, instead of the carriage belt, another driving system can also be used such as a component including a lead screw that is rotated and driven, for example, by the carriage motor and extends in the X direction and an engaging part that is provided to the carriage unit 2 and engaged to a groove of the lead screw.

The fed recording medium 3 is nipped and conveyed by a feeding roller and a pinching roller to be guided to a recording position (main scanning area of the recording head) on a platen 4. In general, since a capping is provided to an orifice face of the recording head in a resting state, prior to the recording, the cap is released to put the recording head and the carriage unit 2 into a state in which scanning can be performed. Thereafter, when data for one scanning operation is accumulated in a buffer, the carriage unit 2 is caused to perform the scanning by the carriage motor, and the recording is performed as described above.

Herein, a flexible wiring substrate 190 for supplying a driving pulse for the ejection driving, a signal for a head temperature adjustment, and the like is attached to the recording head. The other terminal of the flexible wiring substrate 190 is connected to a control unit (not illustrated) provided with a control circuit such as a CPU configured to execute a control of this printer.

Figure 3:
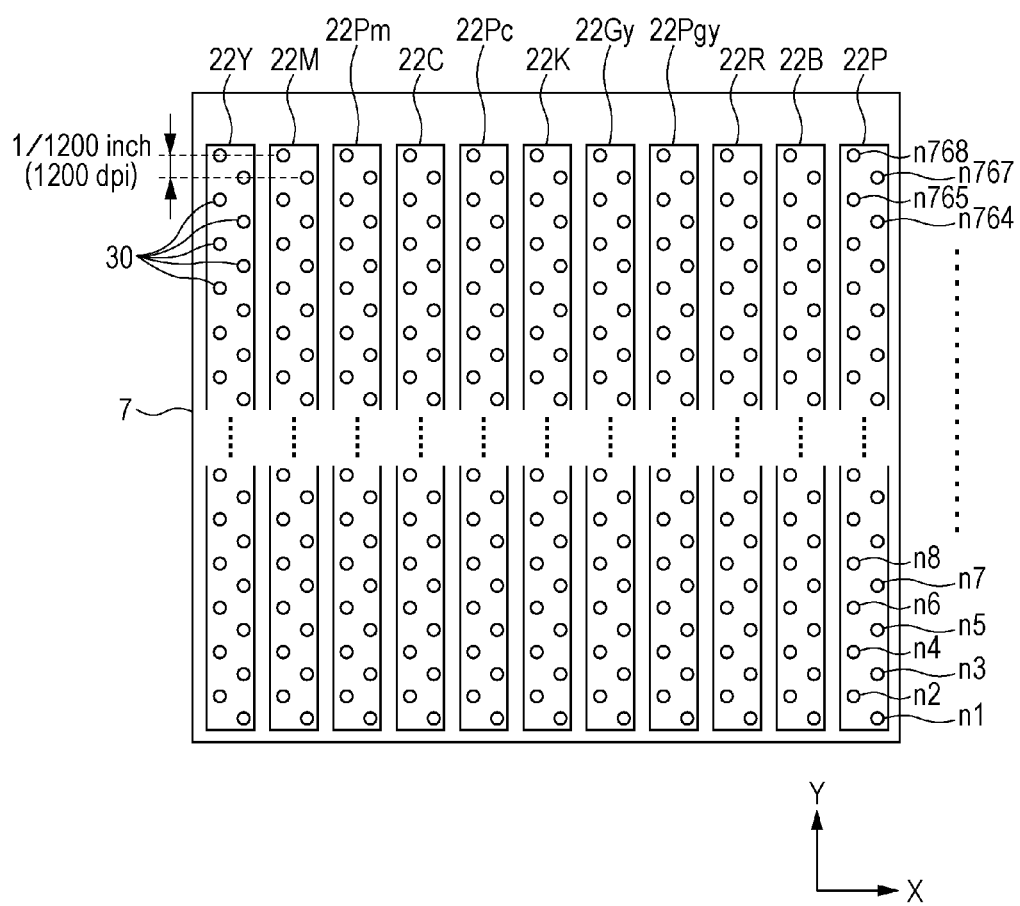
FIG. 3 is a schematic diagram of a recording head applied to the exemplary embodiment.

FIG. 3 illustrates the recording head used in the present exemplary embodiment.

A recording head 7 is constituted by arranging 11 ejection opening columns 22Y, 22M, 22Pm, 22C, 22Pc, 22Bk, 22Gy, 22Pgy, 22R, 22B, and 22P (hereinafter, one of the ejection opening column among these opening columns will be also referred to as an ejection opening column 22), from which respective ink including yellow (Y), magenta (M), photo magenta (Pm), cyan (C), photo cyan (Pc), black (Bk), gray (Gy), photo gray (Pgy), red (R), blue (B), and processing liquid (P) having a purpose of protecting a recording surface, improving a uniformity of glossiness, or the like other than coloring can be respectively ejected, in the X direction in the stated order. The ejection opening columns 22 is constituted by arranging 768 ejection openings (hereinafter, will be also referred to as nozzles) 30 for ejecting the respective ink at a density of 1200 dpi in the Y direction (predetermined direction). It should be noted that the mutual ejection openings 30 located to be adjacent to each other in the Y direction are arranged at positions mutually shifted in the X direction. Herein, the ejection amount of ink ejected at a time from the single ejection opening 30 according to the present exemplary embodiment is approximately 4.5 ng.

It should be noted that, for simplicity in the following explanation, the ejection opening 30 located on the most upstream side in the Y direction of the 768 ejection openings in the respective ejection opening columns 22 is referred to as n1. The ejection opening 30 adjacent to n1 on the downstream side in the Y direction is referred to as n2. Furthermore, the ejection opening 30 adjacent to n2 on the downstream side in the Y direction is referred to as n3. Similarly, the respective ejection openings 30 are referred to as n4 to n768. The ejection opening 30 located on the most downstream side in the Y direction of the 768 ejection openings in the respective ejection opening columns 22 is referred to as n768.

The ejection opening columns 22 are connected to ink tanks that are not illustrated in the drawing and store respectively corresponding ink to perform ink supply. It should be noted that the recording head 7 and the ink tank used in the present exemplary embodiment may be integrally constituted or may have a configuration in which the recording head 7 and the ink tank can be separated from each other.

Figure 4:
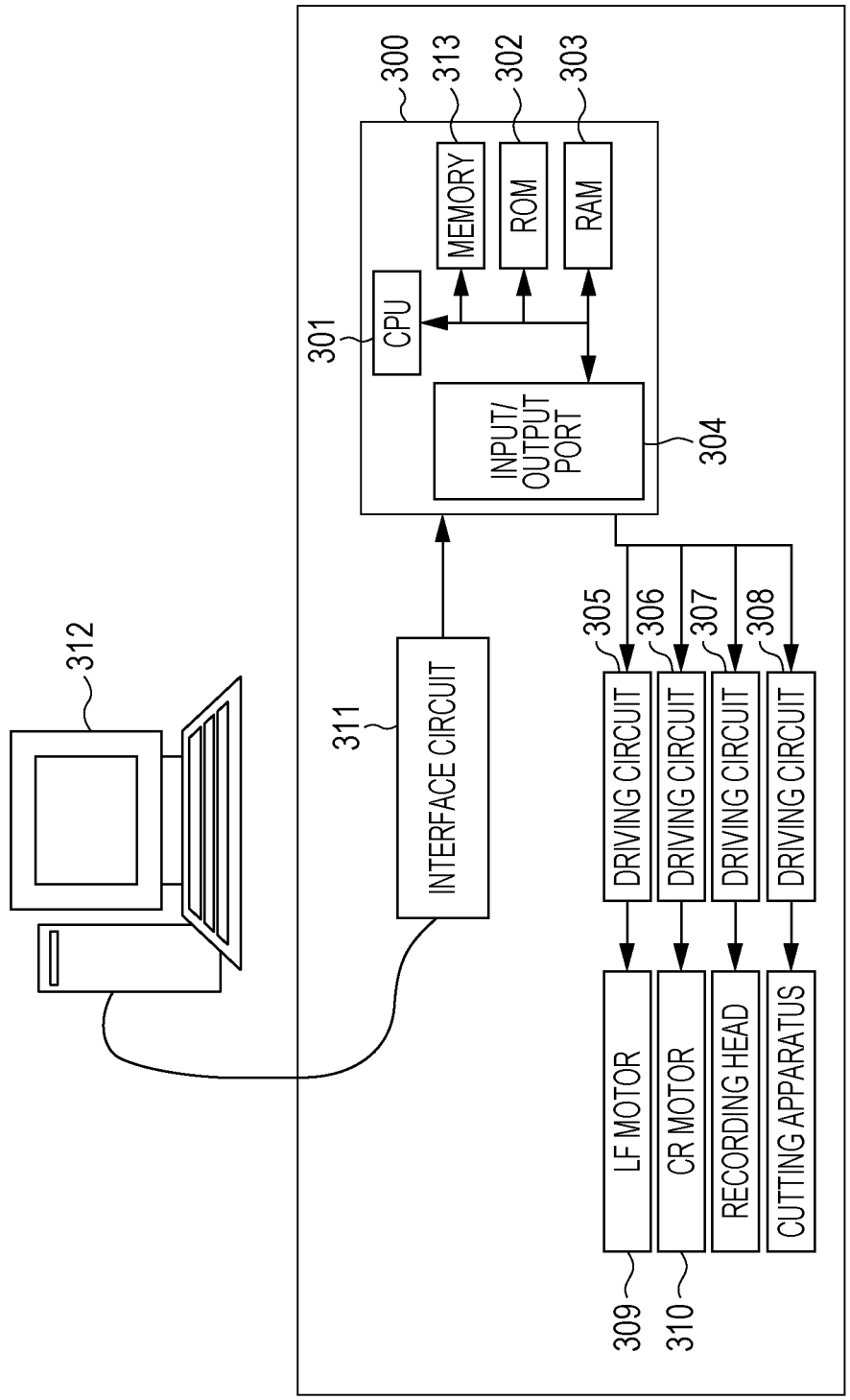
FIG. 4 is a schematic diagram illustrating a recording control system according to the exemplary embodiment.

FIG. 4 is a block diagram illustrating an outline configuration of a control system according to the present exemplary embodiment. A main control unit 300 is provided with a CPU 301 configured to execute processing operations such as calculation, selection, determination, and control, a ROM 302 that stores a control program to be executed by the CPU 301, a RAM 303 used as a recording data buffer or the like, an input/output port 304, and the like. A memory 313 stores image data which will be described below, the mask pattern, faulty nozzle data, and the like. A conveyance motor (LF motor) 309, a carriage motor (CR motor) 310, and respective driving circuits 305, 306, 307, and 308 such as actuators in the recording head 7 and a cutting apparatus are connected to the input/output port 304. Furthermore, the main control unit 300 is connected to a PC 312 functioning as a host computer via an interface circuit 311.

Multipass Recording Method

According to the present exemplary embodiment, the recording head forms an image in accordance with a so-called multipass recording method in which the recording head is caused to perform the scanning plural times with respect to a unit area on the recording medium to perform the recording.

Figure 5:
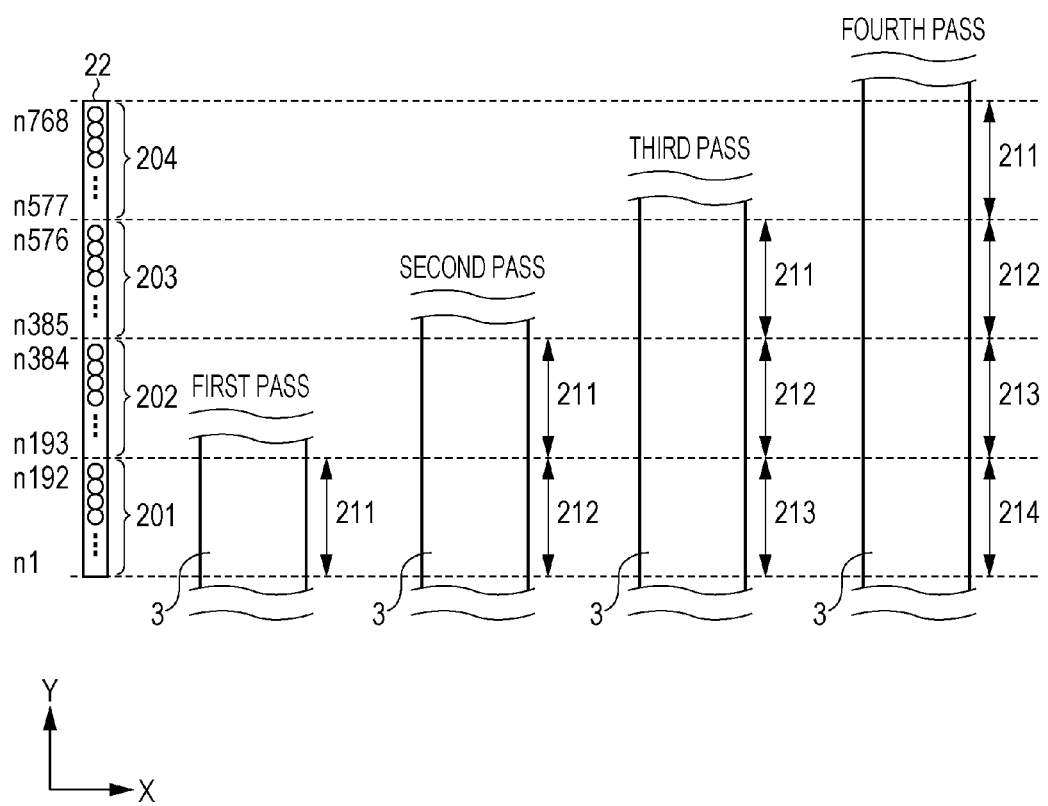
FIG. 5 is an explanatory diagram for describing a multipass recording method according to the exemplary embodiment.

FIG. 5 is an explanatory diagram for describing the multipass recording method executed in the present exemplary embodiment.

The respective ejection openings 30 provided in the ejection opening column 22 for ejecting the ink are divided into four ejection opening groups 201, 202, 203, and 204 along the Y direction. Herein, lengths of the respective ejection opening groups 201, 202, 203, and 204 in the Y direction are L/4 in a case where a length of the ejection opening column 22 in the Y direction is set as L.

The ejection opening column 22 used in the present exemplary embodiment includes the 768 ejection openings 30 as illustrated in FIG. 3. Therefore, 192 (=768/4) ejection openings belong to one ejection opening group. More specifically, the ejection openings n1 to n192 belong to the ejection opening group 201, the ejection openings n193 to n384 belong to the ejection opening group 202, the ejection openings n385 to n576 belong to the ejection opening group 203, and the ejection openings n577 to n768 belong to the ejection opening group 204.

In the first recording scanning (first pass), the ink is ejected from the ejection opening group 201 to a unit area 211 on the recording medium 3, and dots for formed on the recording medium.

Next, the recording medium 3 is conveyed relatively with respect to the recording head 7 by a distance corresponding to a width in the Y direction of one ejection opening group from the upstream side to the downstream side in the Y direction.

Thereafter, the second recording scanning is performed. In the second recording scanning (second pass), the ink is ejected from the ejection opening group 202 to the unit area 211 on the recording medium, and the ink is ejected from the ejection opening group 201 to a unit area 212.

Subsequently, the recording scanning of the recording head 7 and the relative conveyance of the recording medium 3 are alternately repeated. As a result, after the fourth recording scanning (fourth pass) is performed, the ink is ejected from the ejection opening groups 201, 202, 203, and 204 once each in the unit area 211 on the recording medium 3.

It should be noted that the case where the recording is performed by performing the scanning four times has been described herein, but the recording can be performed by a similar process even in a case where the recording is performed by performing the scanning the other number of times.

Data Processing Process

Figure 6:
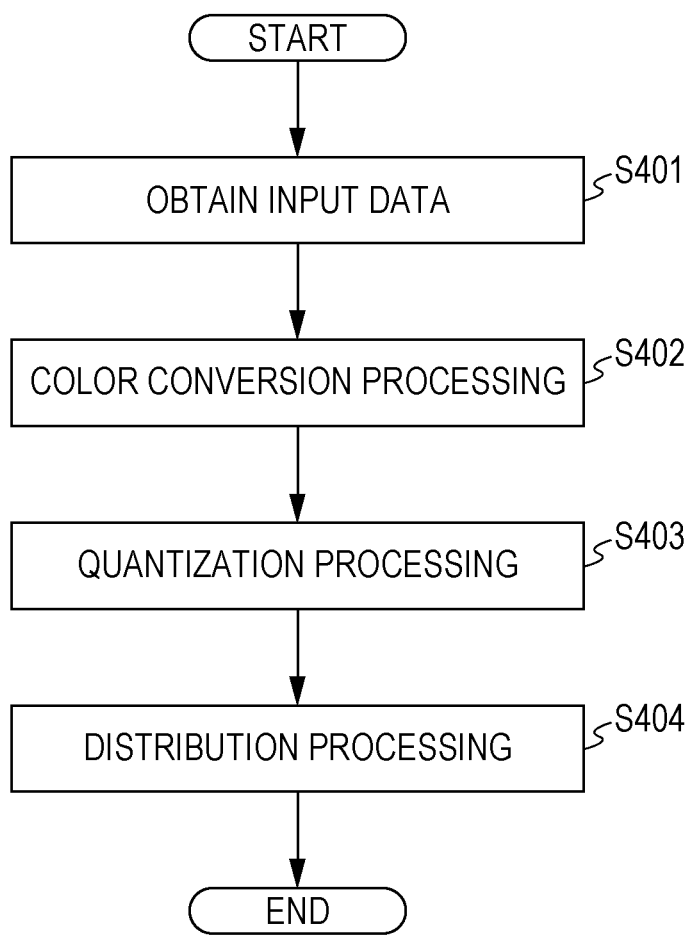
FIG. 6 illustrates a data processing procedure according to the exemplary embodiment.

FIG. 6 is a flow chart of recording data generation processing used for the recording executed by the CPU in accordance with a control program according to the present exemplary embodiment.

First, in step S401, an inkjet recording apparatus 1000 obtains input data in an RGB format input from the PC 312 functioning as the host computer.

Next, in step S402, color conversion processing is performed on the input data in the RGB format to be converted into multi-value data corresponding to colors of the ink used for the recording. The multi-value data represented by 8-bit 256-value information in which a grayscale is set in each of pixel area groups constituted by a plurality of pixel areas is generated by this color conversion processing.

Next, in step S403, quantization processing for quantizing the multi-value data is performed by using a quantization pattern that will be described below. Quantized data represented by 1-bit 2-value information that specifies ejection or non-ejection of the ink to each pixel area is generated by this quantization processing.

Subsequently, in step S404, distribution processing of distributing the quantized data to a plurality of scanning operations is performed by using a mask pattern that will be described below. Recording data represented by 1-bit 2-value information that specifies ejection or non-ejection of the ink to each pixel area in each of the plurality of scanning operations is generated by this distribution processing.

It should be noted that the PC 312 may perform the process up to the quantization processing (S405), and the inkjet recording apparatus 1000 may perform the distribution processing (S404).

Dither Pattern

Figure 7A:
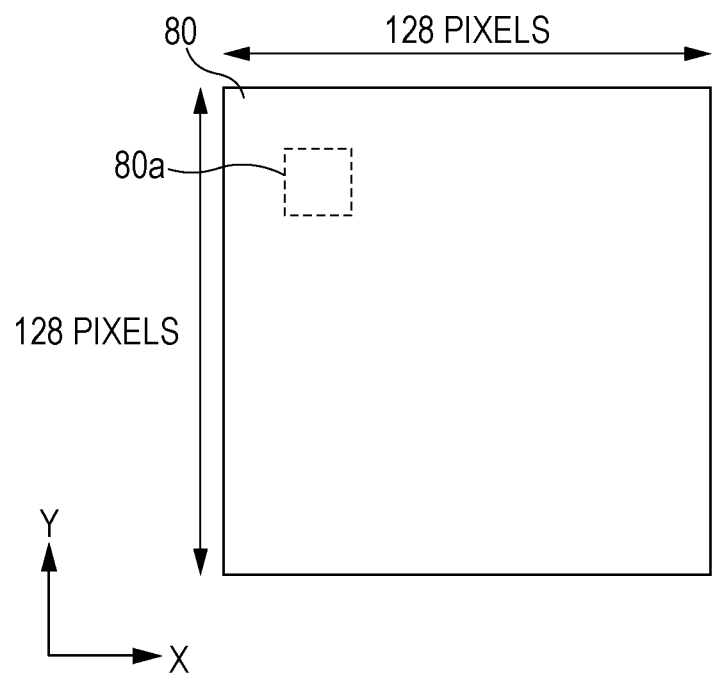
FIGS. 7A and 7B are schematic diagrams illustrating a dither pattern according to the exemplary embodiment.
Figure 7B:
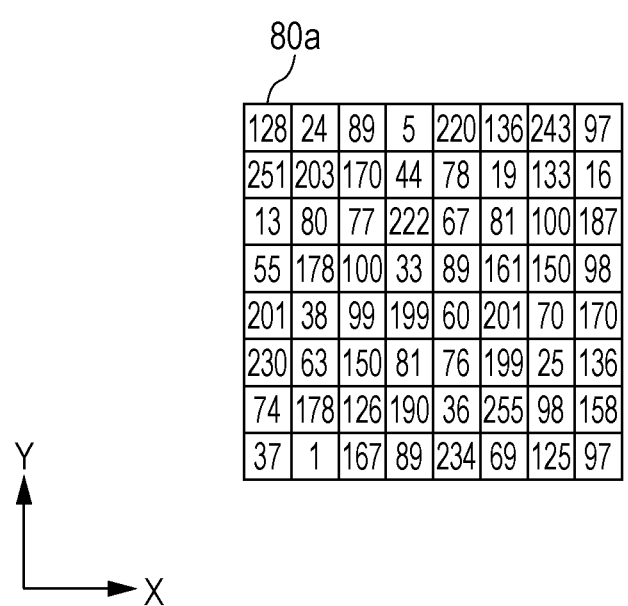

FIG. 7A is a schematic diagram of the quantization pattern 80 used in the quantization processing according to the present exemplary embodiment. FIG. 7B is an expanded view illustrating an area 80a in the quantization pattern in illustrated in FIG. 7A. It should be noted that, according to the present exemplary embodiment, a dither pattern in which a threshold is set for specifying ejection or non-ejection of the ink to each of the plurality of pixel areas is used as the quantization pattern.

As illustrated in FIG. 7A, the dither pattern 80 used in the present exemplary embodiment has the size of 128 pixels in the X direction and 128 pixels in the Y direction. With respect to each of these 128 pixels×128 pixels, one of 255 values from 1 to 255 is set as a threshold for the pixel as illustrated in the expanded view of FIG. 7B.

In the quantization processing in step S403 according to the present exemplary embodiment, a grayscale value indicated by the multi-value data at a certain pixel is compared with a threshold indicated by the dither pattern 80 in the corresponding pixel. The quantized data is generated in a manner that the ink ejection is to the pixel specified in a case where the grayscale value is higher than or equal to the threshold, and the ink non-ejection is to the pixel specified in a case where the grayscale value is lower than the threshold.

Herein, the thresholds are set with respect to 128×128 pixels in the dither pattern illustrated in FIGS. 7A and 7B such that the ejection amount of the ink in 256 stages in accordance with 256 grayscale values from 0 to 255 indicated by the multi-value data can be reproduced. For example, in a case where the multi-value data having a gray scale value of 64 (=256/4) is input to all of the 128×128 pixels corresponding to the quantization pattern 80, the respective thresholds are set to generate the quantized data that specifies the ink ejection to approximately 4096 (=128× 128/4) pixels. That is, the dither pattern 80 illustrated in FIG. 7A is determined such that the number of pixels where the threshold lower than or equal to 64 is set becomes approximately 4096. For example, in a case where the multi-value data having a gray scale value of 128 (=256/2) is input to all of the 128×128 pixels corresponding to the quantization pattern 80, the respective thresholds are set to generate the quantized data that specifies the ink ejection to approximately 8192 (=128×128/2) pixels. That is, the dither pattern 80 illustrated in FIG. 7A is determined such that the number of pixels where the threshold lower than or equal to 128 becomes approximately 8192. In other words, the dither pattern 80 is determined such that the numbers of pixels in which the respective thresholds 1 to 255 are set in the dither pattern 80 are substantially mutually the same among the pixels.

It should be noted that the above-described dither pattern is an example of the dither patterns to which the present exemplary embodiment can be applied, and a different dither pattern can also be appropriately set in view of other elements.

Mask Pattern

FIG. 8A1 is a schematic diagram illustrating a mask pattern 81 corresponding to the first scanning with respect to the unit area used in the distribution processing according to the present exemplary embodiment. FIG. 8A2 is an expanded view illustrating a certain area 81a in the mask pattern 81.

FIG. 8B1 is a schematic diagram illustrating a mask pattern 82 corresponding to the second scanning with respect to the unit area used in the distribution processing according to the present exemplary embodiment. FIG. 8B2 is an expanded view illustrating a certain area 82a in the mask pattern 82.

FIG. 8C1 is a schematic diagram illustrating a mask pattern 83 corresponding to the third scanning with respect to the unit area used in the distribution processing according to the present exemplary embodiment. FIG. 8C2 is an expanded view illustrating a certain area 83a in the mask pattern 83.

FIG. 8D1 is a schematic diagram illustrating a mask pattern 84 corresponding to the fourth scanning with respect to the unit area used in the distribution processing according to the present exemplary embodiment. FIG. 8D2 is an expanded view illustrating a certain area 84a in the mask pattern 84.

As illustrated in FIGS. 8A1, 8B1, 8C1, and 8D1, the mask patterns 81 to 84 used in the present exemplary embodiment each have a size of 128 pixels in the X direction and 128 pixels in the Y direction. This is the same size as that of the dither pattern 80 used in the present exemplary embodiment. As illustrated in the expanded views of FIGS. 8A2, 8B2, 8C2, and 8D2, permission or prohibition of the recording to the pixel is specified for each of these 128×128 pixels. It should be noted that, in FIGS. 8A2, 8B2, 8C2, and 8D2, a blackened pixel represents a recording permission pixel where the ejection of the ink is permitted, and a void pixel represents a recording prohibition pixel where the ejection of the ink is not permitted.

In the distribution processing in step S404 according to the present exemplary embodiment, recording data is generated on the basis of the ejection/non-ejection of the ink specified by the quantized data of a certain pixel and the permission/prohibition of the ink ejection respectively specified by the mask patterns 81 to 84 in the corresponding pixel. More specifically, in a case where the quantized data at the certain pixel specifies the ejection of the ink, and also the mask pattern specifies the permission of the ink ejection, the recording data is generated such that the ink is ejected to the pixel in the scanning corresponding to the mask pattern. On the other hand, in a case where the quantized data at the certain pixel specifies the ejection of the ink, and also the mask pattern specifies the prohibition of the ink ejection, the recording data is generated such that the ink is not ejected to the pixel in the scanning corresponding to the mask pattern. In a case where the quantized data at the certain pixel specifies the non-ejection of the ink, the recording data is generated such that the ink is not ejected irrespective of the permission/prohibition of the ink ejection specified by the mask pattern.

Herein, the recording permission pixels are arranged at mutually complementary and exclusive positions in the mask patterns 81 to 84 illustrated in FIGS. 8A1, 8A2, 8B1, 8B2, 8C1, 8C2, 8D1, and 8D2. That is, with respect to the respective pixels, the permission of the ink ejection is specified in one mask pattern among the four mask patterns 81 to 84, and also, the prohibition of the ink ejection is specified in the other three mask patterns. Accordingly, for example, in a case where the quantized data that specifies the ejection of the ink is input to all of the 128×128 pixels corresponding to the mask patterns 81 to 84, the ink can be ejected to the respective pixel areas in one scanning operation among the first to fourth scanning operations.

In addition, the mask patterns 81 to 84 illustrated in FIGS. 8A1, 8A2, 8B1, 8B2, 8C1, 8C2, 8D1, and 8D2 are determined to mutually have substantially the same number of the recording permission pixels. Accordingly, for example, in a case where the quantized data that specifies the ejection of the ink is input to all of the 128×128 pixels corresponding to the mask patterns 81 to 84, the number of times to perform the ink ejection in each of the first to fourth scanning operations can be set as substantially the same.

From the above-described configuration, it may be understood that a recording permission ratio defined by a ratio of the number of the recording permission pixels with respect to a sum of the number of the recording permission pixels and the number of the recording prohibition pixels is all set as 25% in each of the mask patterns 81 to 84 illustrated in FIGS. 8A1, 8A2, 8B1, 8B2, 8C1, 8C2, 8D1, and 8D2.

It should be noted that the above-described mask pattern is an example of mask patterns to which the present exemplary embodiment can be applied, and a different mask pattern can be appropriately set by taking other elements into account.

Synchronization of the Dither Pattern and the Mask Pattern

The dither pattern 80 and each of the mask patterns 81 to 84 used in the present exemplary embodiment are determined while being associated with each other. It should be noted that, in the following explanation, the determination of the dither pattern and the mask pattern while being associated with each other will be also referred to as synchronization of the dither pattern and the mask pattern.

More specifically, according to the present exemplary embodiment, in a case where the multi-value data that specifies a grayscale value of 64 (=256×0.25) corresponding to a grayscale value of 25% is quantized by using the dither pattern 80, and the generated quantized data is distributed to the first scanning by using the mask pattern 81, the dither pattern 80 and the mask pattern 81 are determined while being associated with each other such that the dispersibility of the pixels where the ejection of the ink is specified by the generated recording data corresponding to the first scanning is set to be high to some extent. That is, the dither pattern 80 and the mask pattern 81 are determined as follows. The recording data indicating the image in which the pixels where the ejection of the ink is specified as illustrated in FIG. 1C1 spatially evenly exist can be generated instead of the recording data indicating the image having a conspicuous spatial deviation of the pixels where the ejection of the ink is specified as illustrated in FIG. 1B1.

Furthermore, according to the present exemplary embodiment, similarly in a case where the multi-value data that specifies a grayscale value of 128 (=256×0.5) corresponding to a grayscale value of 50% is input, a case where the multi-value data that specifies a grayscale value of 192 (=256×0.75) corresponding to a grayscale value of 75% is input, and a case where the multi-value data that specifies a grayscale value of 256 (=256×1) corresponding to a grayscale value of 100% is input, the dither pattern 80 and the mask pattern 81 are determined while being associated with each other such that the dispersibility of the pixels where the ejection of the ink is specified by the generated recording data corresponding to the first scanning is set to be high to some extent.

Herein, as an evaluation of the dispersibility, the dither pattern 80 and the mask pattern 81 are preferably determined in a manner that an arrangement of the dots based on the recording data does not exhibit white noise characteristics. The dither pattern 80 and the mask pattern 81 are more preferably determined in a manner that the arrangement of the dots based on the recording data does not exhibit red noise characteristics. Furthermore, the dither pattern 80 and the mask pattern 81 are still more preferably determined in a manner that the arrangement of the dots based on the recording data exhibit blue noise characteristics.

The synchronization of the mask pattern 81 and the dither pattern 80 corresponding to the first scanning has been described herein, and the synchronization of the mask pattern 82 and the dither pattern 80 corresponding to the second scanning, the synchronization of the mask pattern 83 and the dither pattern 80 corresponding to the third scanning, and the synchronization of the mask pattern 84 and the dither pattern 80 corresponding to the fourth scanning are all similarly performed.

Therefore, the dither pattern 80 used in the present exemplary embodiment and the respective mask patterns 81 to 84 are determined while be being associated with each other in the respective grayscales at 25%, 50%, 75%, and 100%.

It should be noted that the association according to the present exemplary embodiment is performed when the data of the mask patterns is created. For example, first, the dither pattern is prepared in which thresholds to be compared with grayscale data are arranged. Subsequently, the mask patterns are determined in a manner that the pixels formed by the respective scanning operations have the above-described dispersed state when viewed from each of the respective passes alone by taking into account the thresholds of the respective pixels of this dither pattern.

Specifically, while the thresholds of the respective pixels of the dither pattern are taken into account, positions where the pixel formation to the positions in the unit area is permitted are determined in the respective scanning operations. As an alternative configuration to the above, the number of dots permitted to be formed in the respective positions is determined.

For example, a certain dither pattern is a previously determined pattern, and a dot formation pixel to a predetermined position is determined in the mask pattern corresponding to one certain scanning operation. Next, the dot formation pixels are further determined in the remaining positions, but at this time, a position where the dispersibility becomes the highest in a case where a dot is further added to the previously formed dot at the predetermined position is set as the next dot formation position. The evaluation of the dispersibility may be performed under a predetermined condition.

In addition, the dither pattern has been described as the previously determined pattern herein. However, when the thresholds of the dither pattern are sequentially determined while the mask pattern is a previously determined pattern, quantized data obtained from a logical product of the dots that may be formed in the respective grayscales and the mask pattern may be evaluated to determine the thresholds.

Application Method of the Dither Pattern and the Mask Pattern

As illustrated in FIGS. 7A and 7B and FIGS. 8A1, 8A2, 8B1, 8B2, 8C1, 8C2, 8D1, and 8D2, the dither pattern 80 and the mask patterns 81 to 84 according to the present exemplary embodiment each have the size of 128 pixels in the Y direction.

On the other hand, as illustrated in FIG. 5, according to the multipass recording method according to the present exemplary embodiment, the conveyance is performed such that the conveyance amount per single conveyance corresponds to a length equivalent to 192 pixels.

Herein, it may be understood that the conveyance amount (192 pixels) is not an integer multiple of the length (128 pixels) in the Y direction in each of the mask patterns 81 to 84 nor one over an integer multiple. In other words, the length in the Y direction in each of the mask patterns 81 to 84 is different from an integer multiple of the conveyance amount and is also different from one over an integer multiple. More specifically, the conveyance amount is 1.5 (=192/128) times as long as the length in each of the mask patterns 81 to 84.

Herein, for example, in a case where the mask pattern 81 illustrated in FIG. 8A1 is applied to 128 ejection openings n192 to n65 in the ejection opening group 201 in the first scanning illustrated in FIG. 5, the mask pattern 81 is not applicable to the other ejection openings n64 to n1 in the ejection opening group 201. That is, the mask pattern 81 having the size of 128 pixels in the Y direction is not applicable since the other ejection openings n64 to n1 are only equivalent to 64 pixels.

In view of the above, according to the present exemplary embodiment, a plurality of mask pattern parts are used which are obtained by dividing each of the mask patterns 81 to 84 set by performing the synchronization of the dither pattern and the mask patterns as illustrated in FIGS. 8A1, 8A2, 8B1, 8B2, 8C1, 8C2, 8D1, and 8D2 into plural parts in the Y direction.

More specifically, according to the present exemplary embodiment, the mask patterns 81 to 84 are divided in a manner that the conveyance amount becomes an integer multiple of the length in the Y direction in each of the plurality of mask pattern parts. Herein, since the conveyance amount is 192 pixels, the mask patterns 81 to 84 are divided in a manner that the length in the Y direction in each of the plurality of mask pattern parts becomes 64 (=192/3) pixels as an example.

Figure 9A:
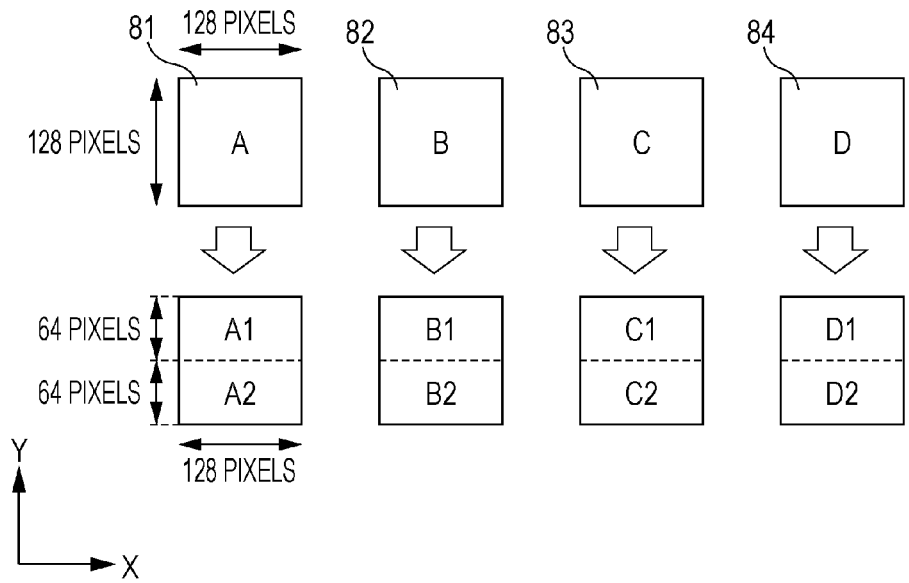
FIGS. 9A and 9B are schematic diagrams illustrating mask pattern parts according to the exemplary embodiment.
Figure 9B:
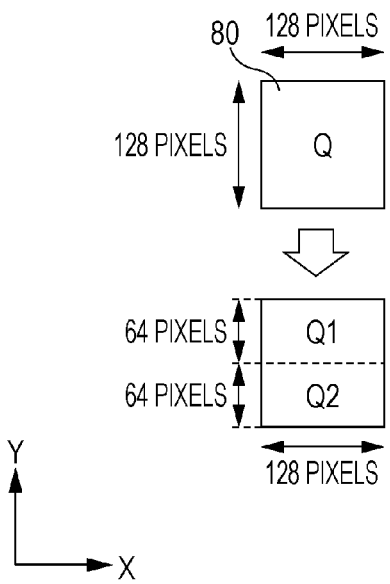

FIG. 9A illustrates the mask pattern parts according to the present exemplary embodiment. It should be noted that, for simplicity in the following explanation, the mask patterns 81, 82, 83, and 84 will be also respectively referred to as mask patterns A, B, C, and D. FIG. 9B schematically illustrates dither pattern parts according to the present exemplary embodiment. For simplicity in the following explanation, the dither pattern 80 is also referred to as a dither pattern Q.

The mask pattern parts are obtained by dividing each of the mask patterns A to D illustrated in FIGS. 8A1, 8A2, 8B1, 8B2, 8C1, 8C2, 8D1, and 8D2 into two parts in the Y direction according to the present exemplary embodiment.

For example, the mask pattern A corresponding to the first scanning is divided into a mask pattern part A1 that is located on the downstream side (pixels) in the Y direction and has the size of 64 pixels×128 pixels and a mask pattern part A2 that is located on the upstream side (pixels) in the Y direction and has the size of 64 pixels×128 pixels.

The mask pattern B corresponding to the second scanning is divided into a mask pattern part B1 that is located on the downstream side in the Y direction and has the size of 64 pixels×128 pixels and a mask pattern part B2 that is located on the upstream side in the Y direction and has the size of 64 pixels×128 pixels.

The mask pattern C corresponding to the third scanning is divided into a mask pattern part C1 that is located on the downstream side in the Y direction and has the size of 64 pixels×128 pixels and a mask pattern part C2 that is located on the upstream side in the Y direction and has the size of 64 pixels×128 pixels.

The mask pattern D corresponding to the fourth scanning is divided into a mask pattern part D1 that is located on the downstream side in the Y direction and has the size of 64 pixels×128 pixels and a mask pattern part D2 that is located on the upstream side in the Y direction and has the size of 64 pixels×128 pixels.

It should be noted that the mask patterns A, B, C, and D are determined in a manner that the above-described recording permission ratios in the respective mask pattern parts A1, B1, C1, and D1 all become 25%. Similarly, the mask patterns A, B, C, and D are determined in a manner that the recording permission ratios in the respective mask pattern parts A2, B2, C2, and D2 also all become 25%.

Herein, the mask pattern parts A1, B1, C1, and D1 are areas set in synchronization with a dither pattern part Q1 located on the downstream side in the Y direction in the dither pattern Q. Therefore, with respect to the quantized data quantized by the dither pattern part Q1 in the quantized data, it is possible to generate the recording data such that the pixels where the ejection of the ink is specified have a high dispersibility by performing the distribution processing using the mask pattern parts A1, B1, C1, and D1.

On the other hand, the mask pattern parts A2, B2, C2, and D2 are areas set in synchronization with a dither pattern part Q2 on the upstream side in the Y direction in the dither pattern Q. Therefore, with respect to the quantized data quantized by the dither pattern part Q2 in the quantized data, it is possible to generate the recording data such that the pixels where the ejection of the ink is specified have a high dispersibility by performing the distribution processing using the mask pattern parts A2, B2, C2, and D2.

That is, the association between the dither pattern and the mask pattern equivalent to the single scanning area is performed in not only the area unit corresponding to the single scanning but also each of two areas in different positions in the Y direction.

According to the present exemplary embodiment, the recording is carried out in accordance with the recording data generated by using the dither pattern illustrated in FIGS. 7A and 7B, the mask patterns illustrated in FIGS. 8A1, 8A2, 8B1, 8B2, 8C1, 8C2, 8D1, and 8D2, and the mask pattern parts illustrated in FIGS. 9A and 9B in the multipass recording method illustrated in FIG. 5.

Figure 10:
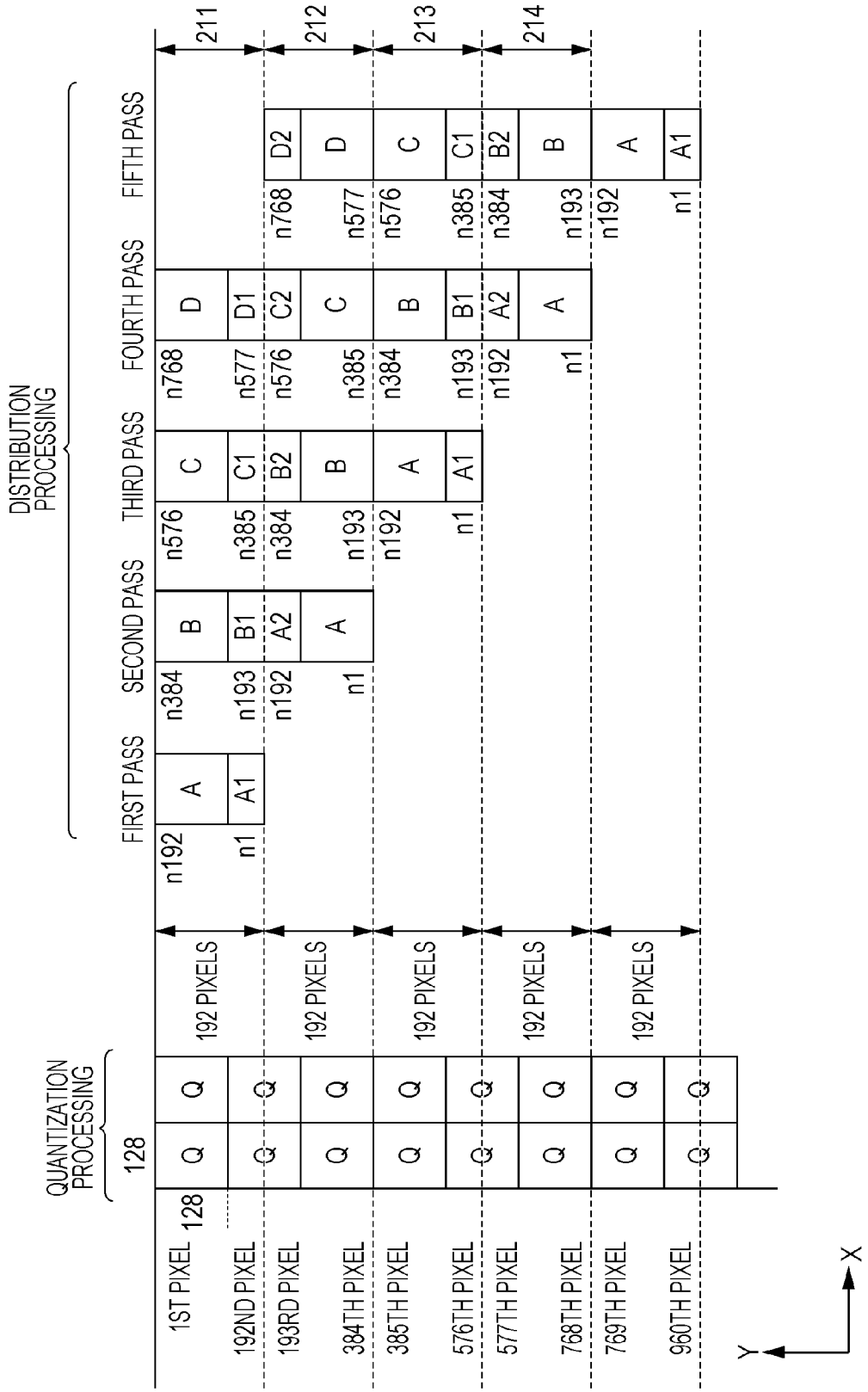
FIG. 10 is a schematic diagram illustrating an application method of the dither pattern and the mask pattern.

FIG. 10 is a schematic diagram illustrating a recording data generation process performed by the CPU according to the present exemplary embodiment. It should be noted that, for simplicity in the following explanation, only the multi-value data located at the 1st to 128th pixels from the upstream side in the X direction will be described.

In the quantization processing in S403 according to the present exemplary embodiment, the quantization is performed by sequentially repeating the application of the dither pattern illustrated in FIGS. 7A and 7B from the downstream side in the Y direction (upper side of the image) and the upstream side in the X direction (left side of the image). For example, as schematically illustrated in FIG. 10, the quantization is performed by using the single dither pattern Q with respect to the area corresponding to the 1st to the 128th pixels from the downstream side in the Y direction of the multi-value data and the 1st to the 128th pixels from the upstream side in the X direction. The quantization is performed by using the single dither pattern Q with respect to the area corresponding to the 129th to the 256th pixels from the downstream side in the Y direction and the 1st to the 128th pixels from the upstream side in the X direction. The quantization is performed by using the single dither pattern Q with respect to the area corresponding to the 257th to the 384th from the downstream side in the Y direction and the 1st to the 128th pixels from the upstream side in the X direction.

In this manner, according to the present exemplary embodiment, the dither pattern Q is sequentially used to perform the quantization irrespective of the sizes of the unit areas 211 to 214. Therefore, the recording is performed in a manner that the area where the quantization is performed by using the single dither pattern Q may stride across two unit areas in some cases. For example, although the area corresponding to the 129th to the 192nd pixels and the area corresponding to the 193rd to the 256th pixels from the downstream side in the Y direction are the areas where the quantization is performed by using the same dither pattern Q, those areas belong to mutually different unit areas.

Next, in the distribution processing in S404, the distribution to the respective scanning operations is performed by using one of the mask patterns A, B, C, and D with respect to the quantized data quantized by using all the areas in the dither pattern Q. On the other hand, with respect to the quantized data quantized by using the area of part (the dither pattern part Q1, Q2) in the dither pattern Q without using the area of the other part, the distribution to the respective scanning operations is performed by using one of the mask pattern parts A1, A2, B1, B2, C1, C2, D1, and D2 corresponding to the area of the part.

For example, the area corresponding to the 1st to the 192nd pixels from the downstream side in the Y direction of the quantized data corresponds to the image recorded in the single unit area 211 on the recording medium. It should be noted that, as may be understood from FIG. 5, the unit area 211 is the area where the recording is performed in the first pass (the first scanning with respect to the unit area 211) by the ejection opening group 201 constituted by n1 to n192, the recording is performed in the second pass (the second scanning with respect to the unit area 211) by the ejection opening group 202 constituted by n193 to n384, the recording is performed in the third pass (the third scanning with respect to the unit area 211) by the ejection opening group 203 constituted by n385 to n576, and the recording is performed in the fourth pass (the fourth scanning with respect to the unit area 211) by the ejection opening group 204 constituted by n577 to n768.

Herein, the area (predetermined area) corresponding to the 1st to the 128th pixels from the downstream side in the Y direction in the area corresponding to the 1st to the 192nd pixels from the downstream side in the Y direction of the quantized data is the area where the quantization is executed by using all the areas of the dither pattern Q.

Therefore, the distribution processing is executed by using the mask patterns A, B, C, and D illustrated in FIGS. 8A1, 8A2, 8B1, 8B2, 8C1, 8C2, 8D1, and 8D2 with respect to the area corresponding to the 1st to the 128th pixels from the downstream side in the Y direction in the quantized data.

On the other hand, the area corresponding to the 129th to the 192nd pixels from the downstream side in the Y direction in the area corresponding to the 1st to the 192nd pixels from the downstream side in the Y direction of the quantized data is the area where the quantization is performed by using the area of part in the dither pattern Q (in the quantization pattern) and also without using the area of the other part. More specifically, as may be understood from FIG. 10, the area corresponding to the 129th to the 192nd pixels from the downstream side in the Y direction of the quantized data is the half of the area on the downstream side in the Y direction of the dither pattern Q, that is, the area where the quantization is performed by using the dither pattern part Q1 schematically illustrated in FIG. 9B.

Therefore, the distribution processing is executed by using the mask pattern parts A1, B1, C1, and D1 illustrated in FIG. 9A corresponding to the dither pattern part Q1 with respect to the area corresponding to the 129th to the 192nd pixels from the downstream side in the Y direction of the quantized data.

Next, the area corresponding to the 193rd to the 384th pixels from the downstream side in the Y direction of the quantized data corresponds to the image recorded in the single unit area 212 on the recording medium. It should be noted that, as may be understood from FIG. 5, the unit area 212 is the area where the recording is performed in the second pass (the first scanning with respect to the unit area 212) by the ejection opening group 201 constituted by n1 to n192, the recording is performed in the third pass (the second scanning with respect to the unit area 212) by the ejection opening group 202 constituted by n193 to n384, the recording is performed in the fourth pass (the third scanning with respect to the unit area 212) by the ejection opening group 203 constituted by n385 to n576, and the recording is performed in the fifth pass (the fourth scanning with respect to the unit area 212) by the ejection opening group 204 constituted by n577 to n768.

Herein, the area corresponding to the 193rd to the 256th pixels from the downstream side in the Y direction in the area corresponding to the 193rd to the 384th pixels from the downstream side in the Y direction of the quantized data is the area where the area where the quantization is performed by using the area of part in the dither pattern Q and also without using the area of the other part. More specifically, as may be understood from FIG. 10, the area corresponding to the 193rd to the 256th pixels from the downstream side in the Y direction of the quantized data is the half of the area on the upstream side in the Y direction of the dither pattern Q, that is, the area where the quantization is performed by the dither pattern part Q2 schematically illustrated in FIG. 9B.

Therefore, the distribution processing is executed by using the mask patterns A2, B2, C2, and D2 illustrated in FIG. 9A corresponding to the dither pattern part Q2 with respect to the area corresponding to the 193rd to the 256th pixels from the upstream side in the Y direction of the quantized data.

On the other hand, the area corresponding to the 257th to the 384th pixels from the downstream side in the Y direction in the area corresponding to the 193rd to the 384th pixels from the downstream side in the Y direction of the quantized data is the area where the quantization is executed by using all the areas of the dither pattern Q.

Therefore, the distribution processing is executed by using the mask patterns A, B, C, and D illustrated in FIGS. 8A1, 8A2, 8B1, 8B2, 8C1, 8C2, 8D1, and 8D2 with respect to the area corresponding to the 257th to the 384th pixels from the downstream side in the Y direction in the quantized data.

Thereafter, the distribution processing with respect to the respective unit areas is similarly executed. That is, the distribution to the respective scanning operations is performed by using a group of the mask patterns A, B, C, and D with respect to the quantized data quantized by using all the areas in the dither pattern Q. On the other hand, the distribution to the respective scanning operations is performed by using a group of the mask pattern parts A1, B1, C1, and D1 corresponding to the dither pattern part Q1 with respect to the quantized data quantized by using the dither pattern part Q1 corresponding to the area of the part in the dither pattern Q without using the dither pattern part Q2 corresponding to the area of the other part. Furthermore, the distribution to the respective scanning operations is performed by using a group of the mask pattern parts A2, B2, C2, and D2 corresponding to the dither pattern part Q2 with respect to the quantized data quantized by using the dither pattern part Q2 corresponding to the area of the part in the dither pattern Q without using the dither pattern part Q1 corresponding to the area of the other part.

It should be noted that the mode has been described in which the mask patterns A, B, C, and D are stored in the memory, and the mask pattern parts A1, A2, B1, B2, C1, C2, D1, and D2 are generated from these mask patterns according to the above-described exemplary embodiment, but the exemplary embodiment can also be carried out on the basis of another mode. For example, a mode may be adopted in which the memory previously stores the mask pattern parts A1, A2, B1, B2, C1, C2, D1, and D2 themselves, and these mask pattern parts are used.

According to the above-described configuration, since the dither pattern can be set without the correlation with the conveyance amount of the recording medium, the degree of freedom at the time of the setting of the dither pattern is not degraded. Furthermore, the mask pattern part associated with the area of the part is applied to the quantized data quantized by using the area of the part in the dither pattern without using the area of the other part. Therefore, it is possible to generate the recording data having the low spatial deviation, that is, the high dispersibility.

Second Exemplary Embodiment

According to the above-described first exemplary embodiment, the mode has been described in which the conveyance amount is constant during the recording on one sheet of the recording medium.

In contrast to this, according to the present exemplary embodiment, a mode will be described in which the conveyance amount is varied in accordance with the area in the recording medium where the recording is performed.

It should be noted that parts different from the first exemplary embodiment will be described hereinafter, and descriptions of the other parts similar to the first exemplary embodiment will be omitted.

FIG. 11 is an explanatory diagram for describing the multipass recording method executed in the present exemplary embodiment.

According to the present exemplary embodiment, the recording is performed by repeating the ejection of the ink from the respective ejection opening groups 201, 202, 203, and 204 in the respective four scanning operations with respect to the unit area and the conveyance of the recording medium in the Y direction at a conveyance amount (first conveyance amount) equivalent to 192 pixels up to the k (k is a natural number)-th scanning with respect to the recording medium similarly as in the multipass recording method according to the first exemplary embodiment illustrated in FIG. 5. Subsequently, from the (k+1)-th scanning, the recording is performed by changing the conveyance amount to a conveyance amount (second conveyance amount) equivalent to 96 pixels which is shorter than the first conveyance amount for the conveyance.

Hereinafter, the multipass recording method in the (k+1)-th and subsequent scanning operations according to the present exemplary embodiment will be described in detail.

The respective ejection openings 30 provided to the ejection opening column 22 are divided into eight ejection opening groups 221, 222, 223, 224, 225, 226, 227, and 228 along the Y direction. Herein, in a case where a length in the Y direction of the ejection opening column 22 is set as L, a length in the Y direction of each of the ejection opening groups 221 to 228 is L/8.

The ejection opening column 22 used in the present exemplary embodiment includes 768 ejection openings 30 as illustrated in FIG. 3. Therefore, 96 (=768/8) ejection openings belong to one ejection opening group. More specifically, the ejection openings n1 to n96 belong to the ejection opening group 221, the ejection openings n97 to n192 belong to the ejection opening group 222, the ejection openings n193 to n288 belong to the ejection opening group 223, and the ejection openings n289 to n384 belong to the ejection opening group 224. Furthermore, the ejection openings n385 to n480 belong to the ejection opening group 225, the ejection openings n481 to n576 belong to the ejection opening group 226, the ejection openings n577 to n672 belong to the ejection opening group 227, and the ejection openings n673 to n768 belong to the ejection opening group 228.

In the k-th recording scanning (k-th pass), the ink is ejected from the ejection opening groups 221 and 222 to a unit area 231 on the recording medium 3.

Next, the recording medium 3 is conveyed relatively with respect to the recording head 7 from the upstream side to the downstream side in the Y direction by a distance (equivalent to 96 pixels) corresponding to the width in the Y direction of one of the ejection opening groups 221 to 228.

Thereafter, the (k+2)-th recording scanning ((k+2)-th pass) is performed. In the (k+2)-th recording scanning, the ink is ejected from the ejection opening groups 222 and 223 in the unit area 231 on the recording medium. On the other hand, the ink is ejected from the ejection opening group 221 to a unit area 232. As may be understood from this, the unit area 231 has the size (equivalent to 192 pixels) corresponding to the width in the Y direction of the two ejection opening group, but the unit area 232 has the size (equivalent to 96 pixels) corresponding to the width in the Y direction of the one ejection opening group.

Next, the recording medium 3 is conveyed relatively with respect to the recording head 7 from the upstream side to the downstream side in the Y direction by a distance (equivalent to 96 pixels) corresponding to the width in the Y direction of one of the ejection opening groups 221 to 228.

Thereafter, in the (k+3)-th recording scanning, the ink is ejected from the ejection opening groups 223 and 224 to the unit area 231 on the recording medium. The ink is ejected from the ejection opening group 222 to the unit area 232, and the ink is ejected from the ejection opening group 221 to a unit area 233.

Thereafter, the recording scanning of the recording head 7 and the conveyance of the recording medium 3 at the conveyance amount equivalent to 96 pixels are alternately repeated.

As a result, when the (k+4)-th pass is ended, the ink is ejected to the unit area 231 four times including the ejection from the ejection opening groups 221 and 222 in the (k+1)-th pass, the ejection from the ejection opening groups 222 and 223 in the (k+2)-th pass, the ejection from the ejection opening groups 223 and 224 in the (k+3)-th pass, and the ejection from the ejection opening groups 224 and 225 in the (k+4)-th pass, and the recording with respect to the unit area 231 is ended.

When the (k+5)-th pass is ended, the ink is ejected to the unit area 232 four times including the ejection from the ejection opening group 222 in the (k+2)-th pass, the ejection from the ejection opening group 223 in the (k+3)-th pass, the ejection from the ejection opening group 224 in the (k+4)-th pass, and the ejection from the ejection opening group 225 in the (k+5)-th pass, and the recording with respect to the unit area 232 is ended.

In this manner, according to the present exemplary embodiment, the recording is performed at a relatively long conveyance amount (equivalent to 192 pixels) on the unit area where the recording is ended by the scanning in the (k+1)-th pass, that is, the unit area (not illustrated) located on the downstream side in the Y direction with respect to the unit area 231. On the other hand, the recording is performed at a relatively short conveyance amount (equivalent to 96 pixels) on the unit areas 233, 234, and 235 located on the upstream side in the Y direction with respect to the unit area 232.

While the conveyance amount is varied in accordance with the recording area as described above, it is possible to attain various advantages.

It should be noted that the mode has been described herein in which, after the recording along with the conveyance at the relatively long conveyance amount is performed, the recording along with the conveyance at the relatively short conveyance amount is performed as an example, but the present exemplary embodiment can be applied to a mode in which the recording along with the conveyance at a plurality of combinations of conveyance amounts with respect to one sheet of recording medium is performed. For example, it has been generally suggested that, when an image is recorded, a misalignment of the conveyance of the recording medium easily occurs in an end part area on the upstream side and an end part area on the downstream side in the conveyance direction (Y direction) on the recording medium. In the above-described case, by shortening the conveyance amount when the recording is performed in the end part on the upstream side and the end part on the downstream side, it is possible to reduce an influence of the misalignment of the conveyance even if the misalignment of the conveyance occurs since the conveyance amount itself is short. On the other hand, when the recording is performed in a central part in the conveyance direction (Y direction) where the misalignment of the conveyance hardly occurs, it is possible to shorten the time used for the recording by lengthening the conveyance amount. Therefore, in the above-described case, the control may be performed such that the conveyance amount is shortened when the recording is performed in the end part on the downstream side in the Y direction of the recording medium immediately after the recording is started, the conveyance amount is thereafter lengthened when the recording is performed in the central part in the Y direction of the recording medium, and the conveyance amount is shortened again when the recording is performed in the end part on the upstream side in the Y direction of the recording medium immediately before the recording is ended. The present exemplary embodiment to be described below can be also applied to the above-described mode.

Application Method of the Dither Pattern and the Mask Pattern

According to the present exemplary embodiment, the dither pattern 80 and the mask patterns 81 to 84 illustrated in FIGS. 7A and 7B and FIGS. 8A1, 8A2, 8B1, 8B2, 8C1, 8C2, 8D1, and 8D2 which all have the size of 128 pixels in the Y direction are used to generate recording data similarly as in the first exemplary embodiment.

As illustrated in FIGS. 7A and 7B and FIGS. 8A1, 8A2, 8B1, 8B2, 8C1, 8C2, 8D1, and 8D2, the dither pattern 80 and the mask patterns 81 to 84 according to the present exemplary embodiment all have the size of 128 pixels in the Y direction.

On the other hand, as described above, the recording is performed by switching the conveyance equivalent to 192 pixels corresponding to the first conveyance amount and the conveyance equivalent to 96 pixels corresponding to the second conveyance amount during the recording according to the present exemplary embodiment.

Herein, both the first conveyance amount (192 pixels) and the second conveyance amount (96 pixels) are not an integer multiple of the length in the Y direction in each of the mask patterns 81 to 84 (128 pixels) nor one over an integer multiple. For this reason, similarly as in the first exemplary embodiment, the dither pattern and the mask patterns illustrated in FIGS. 7A and 7B and FIGS. 8A1, 8A2, 8B1, 8B2, 8C1, 8C2, 8D1, and 8D2 are not applicable to the multipass recording method illustrated in FIG. 11.

In view of the above, similarly as in the first exemplary embodiment, according to the present exemplary embodiment too, the plurality of mask pattern parts are used which are obtained by dividing the respective mask patterns 81 to 84 set by performing the synchronization of the dither pattern and the mask patterns illustrated in FIGS. 8A1, 8A2, 8B1, 8B2, 8C1, 8C2, 8D1, and 8D2 into a plurality of parts in the Y direction.

It should be noted however that, according to the present exemplary embodiment, two conveyance amounts including the first conveyance amount (192 pixels) and the second conveyance amount (96 pixels) exist as the conveyance amounts. In view of the above, according to the present exemplary embodiment, the mask patterns 81 to 84 are divided in a manner that both the first conveyance amount (192 pixels) and the second conveyance amount (96 pixels) become an integer multiple of the length in the Y direction in each of the plurality of mask pattern parts. More specifically, the mask patterns 81 to 84 are divided in a manner that the length in the Y direction of the mask pattern parts becomes 32 pixels according to the present exemplary embodiment. Since the first conveyance amount (192 pixels) is set as six times as long as the length (32 pixels) in the Y direction of one mask pattern part and the second conveyance amount (96 pixels) is set as three times as long as the length (32 pixels) in the Y direction of one mask pattern part, it may be understood that the above-described condition is satisfied.

Figure 12A:
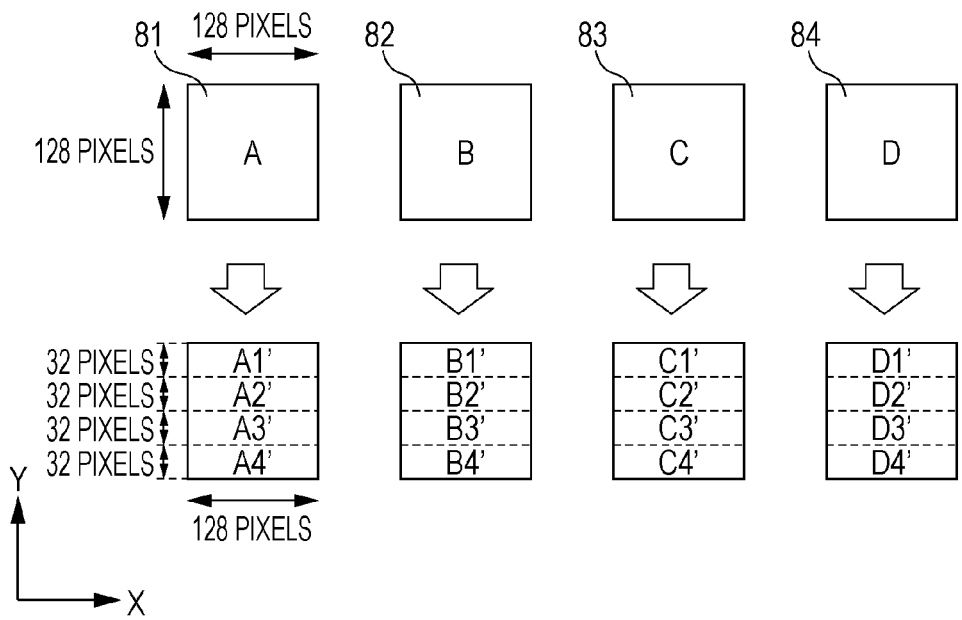
FIGS. 12A and 12B are schematic diagrams illustrating the mask pattern parts according to the exemplary embodiment.

FIG. 12A illustrates the mask pattern parts according to the present exemplary embodiment. FIG. 9B schematically illustrates the dither pattern parts according to the present exemplary embodiment.

According to the present exemplary embodiment, the mask pattern parts are obtained by dividing the respective mask patterns A to D illustrated in FIGS. 8A1, 8A2, 8B1, 8B2, 8C1, 8C2, 8D1, and 8D2 into four parts in the Y direction.

For example, the mask pattern A corresponding to the first scanning is divided into a mask pattern part A1' that is located in the end part on the downstream side in the Y direction (while being outfitted with the nozzles on the downstream side in the Y direction) and has the size of 32 pixels×128 pixels, a mask pattern part A2' that is adjacent to the mask pattern part A1' on the upstream side in the Y direction and has the size of 32 pixels×128 pixels, a mask pattern part A3' that is adjacent to a mask pattern part A4' on the downstream side in the Y direction and has the size of 32 pixels×128 pixels, and the mask pattern part A4' that is located in the end part on the upstream side in the Y direction and has the size of 32 pixels×128 pixels.

The mask pattern B corresponding to the second scanning is divided into a mask pattern part B1' that is located in the end part on the downstream side in the Y direction and has the size of 32 pixels×128 pixels, a mask pattern part B2' that is adjacent to the mask pattern part B1' on the upstream side in the Y direction and has the size of 32 pixels×128 pixels, a mask pattern part B3' that is adjacent to a mask pattern part B4' on the downstream side in the Y direction and has the size of 32 pixels×128 pixels, and the mask pattern part B4' that is located in the end part on the upstream side in the Y direction and has the size of 32 pixels×128 pixels.

The mask pattern C corresponding to the third scanning is divided into a mask pattern part C1' that is located in the end part on the downstream side in the Y direction and has the size of 32 pixels×128 pixels, a mask pattern part C2' that is adjacent to the mask pattern part C1' on the upstream side in the Y direction and has the size of 32 pixels×128 pixels, a mask pattern part C3' that is adjacent to a mask pattern part C4' on the downstream side in the Y direction and has the size of 32 pixels×128 pixels, and the mask pattern part C4' that is located in the end part on the upstream side in the Y direction and has the size of 32 pixels×128 pixels.

The mask pattern D corresponding to the fourth scanning is divided into a mask pattern part D1' that is located in the end part on the downstream side in the Y direction and has the size of 32 pixels×128 pixels, a mask pattern part D2' that is adjacent to the mask pattern part D1' on the upstream side in the Y direction and has the size of 32 pixels×128 pixels, a mask pattern part D3' that is adjacent to a mask pattern part D4' on the downstream side in the Y direction and has the size of 32 pixels×128 pixels, and the mask pattern part D4' that is located in the end part on the upstream side in the Y direction and has the size of 32 pixels×128 pixels.

It should be noted that the mask patterns A, B, C, and D are determined in a manner that the above-described respective recording permission ratios of the mask pattern parts A1', B1', C1', and D1' all become 25%. Similarly, the mask patterns A, B, C, and D are determined in a manner that the respective recording permission ratios of the mask pattern parts A2', B2', C2', and D2' all become 25%. The same also applies to the group of the mask pattern parts A3', B3', C3', and D3' and the group of the mask pattern parts A4', B4', C4', and D4'.

Herein, the mask pattern parts A1', B1', C1', and D1' are the areas set in synchronization with a dither pattern part Q1' located in the end part on the downstream side in the Y direction in the dither pattern Q. Therefore, with respect to the quantized data quantized by the dither pattern part Q1' in the quantized data, it is possible to generate the recording data having the highly dispersed arrangement of the pixels where the ejection of the ink is specified by performing the distribution processing using the mask pattern parts A1', B1', C1', and D1'.

The mask pattern parts A2', B2', C2', and D2' are the areas set in synchronization with a dither pattern part Q2' adjacent to the dither pattern part Q1' on the upstream side in the Y direction in the dither pattern Q. Therefore, with respect to the quantized data quantized by the dither pattern part Q2' in the quantized data, it is possible to generate the recording data having the highly dispersed arrangement of the pixels where the ejection of the ink is specified by performing the distribution processing using the mask pattern parts A2', B2', C2', and D2'.

The mask pattern parts A3', B3', C3', and D3' are the areas set in synchronization with a dither pattern part Q3' adjacent to a dither pattern part Q4' on the downstream side in the Y direction in the dither pattern Q. Therefore, with respect to the quantized data quantized by the dither pattern part Q3' in the quantized data, it is possible to generate the recording data in which the pixels where the ejection of the ink is specified are highly dispersed by performing the distribution processing using the mask pattern parts A3', B3', C3', and D3'.

The mask pattern parts A4', B4', C4', and D4' are the areas set in synchronization with the dither pattern part Q4' located in the end part on the upstream side in the Y direction in the dither pattern Q. Therefore, with respect to the quantized data quantized by the dither pattern part Q4' in the quantized data, it is possible to generate the recording data in which the pixels where the ejection of the ink is specified are highly dispersed by performing the distribution processing using the mask pattern parts A4', B4', C4', and D4'.

Figure 12B:
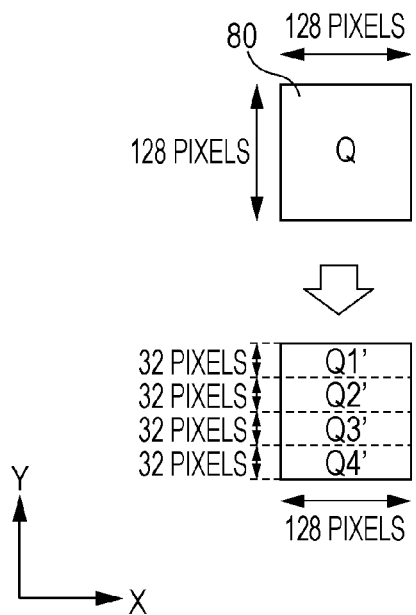

According to the present exemplary embodiment, in the multipass recording method illustrated in FIG. 11, the recording is performed in accordance with the recording data generated by using the dither pattern illustrated in FIGS. 7A and 7B, the mask patterns illustrated in FIGS. 8A1, 8A2, 8B1, 8B2, 8C1, 8C2, 8D1, and 8D2, and the mask pattern parts illustrated in FIGS. 12A and 12B.

Figure 13:
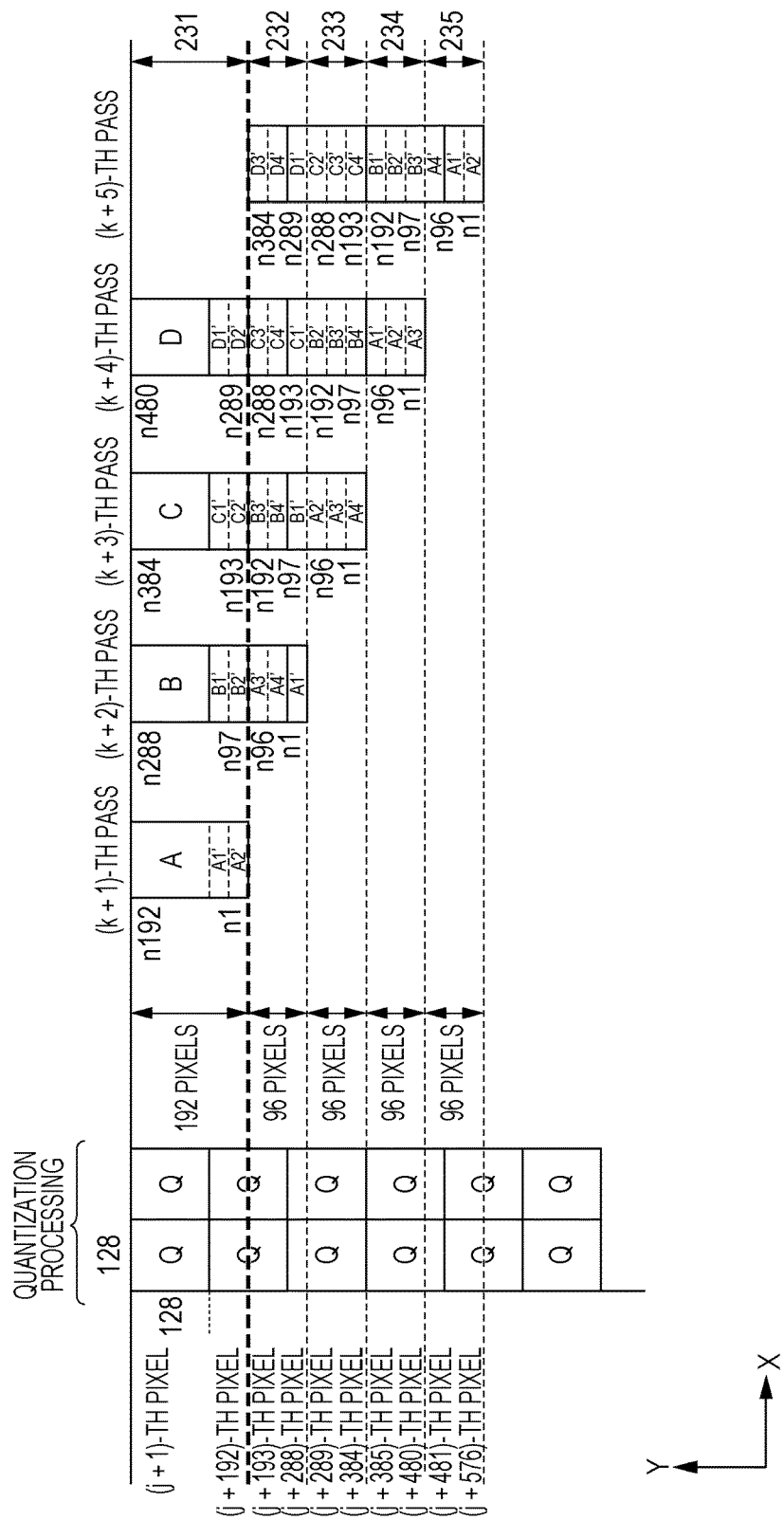
FIG. 13 is a schematic diagram illustrating the application method of the dither pattern and the mask pattern.

FIG. 13 is a schematic diagram illustrating a generation process of the recording data according to the present exemplary embodiment. It should be noted that, for simplicity in the following explanation, only the multi-value data located at the 1st to the 128th pixels from the upstream side in the X direction will be described.

In the quantization processing in S403 according to the present exemplary embodiment, the quantization is performed by sequentially repeating the application of the dither pattern illustrated in FIGS. 7A and 7B from the downstream side in the Y direction (upper side of the image) and the upstream side in the X direction (left side of the image). For example, as schematically illustrated in FIG. 13, the quantization is performed by using the single dither pattern Q with respect to the area corresponding to the (j+1)-th to the (j+128)-th pixels from the downstream side in the Y direction of the multi-value data and the (j+1)-th to the (j+128)-th pixels from the upstream side in the X direction. The quantization is performed by using the single dither pattern Q with respect to the area corresponding to the (j+129)-th to the (j+256)-th pixels from the downstream side in the Y direction and the (j+1)-th to the (j+128)-th pixels from the upstream side in the X direction. The quantization is performed by using the single dither pattern Q with respect to the area corresponding to the (j+257)-th to the (j+384)-th pixels from the downstream side in the Y direction and the (j+1)-th to the (j+128)-th pixels from the upstream side in the X direction.

In this manner, the quantization is sequentially performed by using the dither pattern Q irrespective of the size of the unit area according to the present exemplary embodiment. Therefore, the area where the quantization is performed by using the single dither pattern Q may be formed such that the area strides across two unit areas in some cases. For example, the area corresponding to the (j+129)-th to the (j+192)-th pixels from the downstream side in the Y direction and the area corresponding to the (j+193)-th to the (j+256)-th pixels are the areas where the quantization is performed by using the same dither pattern Q but belong to the mutually different unit areas 231 and 232. In addition, the area corresponding to the (j+257)-th to the (j+288)-th pixels from the downstream side in the Y direction and the area corresponding to the (j+289)-th to the (j+384)-th pixels are the areas where the quantization is performed by using the same dither pattern Q but belong to the mutually different unit areas 232 and 233.

Next, in the distribution processing in S404, the distribution to the respective scanning operations is performed by using one of the mask patterns A, B, C, and D with respect to the quantized data quantized by using all the areas in the dither pattern Q. On the other hand, with respect to the quantized data quantized by using the area of part (the dither pattern part Q1', Q2', Q3', Q4') in the dither pattern Q without using the area of the other parts, the distribution to the respective scanning operations is performed by using one of the mask pattern parts A1', A2', A3', A4', B1', B2', B3', B4', C1', C2', C3', C4', D1', D2', D3', and D4' corresponding to the area of the part.

For example, the area corresponding to the 1st to the 192nd pixels from the downstream side in the Y direction in the quantized data corresponds to the image recorded in the single unit area 211 on the recording medium. It should be noted that, as may be understood from FIG. 11, the unit area 231 is the area where the recording is performed in the (k+1)-th pass (the first scanning with respect to the unit area 231) by the ejection opening group 221 constituted by n1 to n96 and the ejection opening group 222 constituted by n97 to n192, the recording is performed in the (k+2)-th pass (the second scanning with respect to the unit area 231) by the ejection opening group 222 constituted by n97 to n192 and the ejection opening group 223 constituted by n193 to n288, the recording is performed in the (k+3)-th pass (the third scanning with respect to the unit area 231) by the ejection opening group 223 constituted by n193 to n288 and the ejection opening group 224 constituted by n289 to n384, and the recording is performed in the (k+4)-th pass (the fourth scanning with respect to the unit area 231) by the ejection opening group 224 constituted by n289 to n384 and the ejection opening group 225 constituted by n385 to n480.

Herein, the area corresponding to the (j+1)-th to the (j+128)-th pixels from the downstream side in the Y direction in the area corresponding to the (j+1)-th to the (j+192)-th pixels from the downstream side in the Y direction of the quantized data is the area where the quantization is executed by using all the areas of the dither pattern Q.

Therefore, the distribution processing is executed by using the mask patterns A, B, C, and D illustrated in FIGS. 8A1, 8A2, 8B1, 8B2, 8C1, 8C2, 8D1, and 8D2 with respect to the area corresponding to the (j+1)-th to the (j+128)-th pixels from the downstream side in the Y direction in the quantized data.

On the other hand, the area corresponding to the (j+129)-th to the (j+192)-th pixels from the downstream side in the Y direction in the area corresponding to the (j+1)-th to the (j+192)-th pixels from the downstream side in the Y direction of the quantized data is the area where the quantization is performed by using the area of part in the dither pattern Q and also without using the area of the other part.

More specifically, as schematically illustrated in FIG. 13, the area corresponding to the (j+129)-th to the (j+160)-th pixels from the downstream side in the Y direction of the quantized data is the area where the quantization is performed by the dither pattern part Q1' schematically illustrated in FIG. 12B. Therefore, the distribution processing is executed by using the mask pattern parts A1', B1', C1', and D1' illustrated in FIG. 12A corresponding to the dither pattern part Q1' with respect to the area corresponding to the (j+129)-th to the (j+160)-th pixels from the downstream side in the Y direction of the quantized data.

The area corresponding to the (j+161)-th to the (j+192)-th pixels from the downstream side in the Y direction of the quantized data is the area where the quantization is performed by the dither pattern part Q2' schematically illustrated in FIG. 12B. Therefore, the distribution processing is executed by using the mask pattern parts A2', B2', C2', and D2' illustrated in FIG. 12A corresponding to the dither pattern part Q2' with respect to the area corresponding to the (j+161)-th to the (j+192)-th pixels from the downstream side in the Y direction of the quantized data.

Next, the area corresponding to the (j+193)-th to the (j+288)-th pixels from the downstream side in the Y direction of the quantized data corresponds to the image recorded in the one unit area 232 on the recording medium. It should be noted that, as may be understood from FIG. 11, the unit area 232 is the area where the recording is performed in the (k+2)-th pass (the first scanning with respect to the unit area 232) by the ejection opening group 221 constituted by n1 to n96, the recording is performed in the (k+3)-th pass (the second scanning with respect to the unit area 232) by the ejection opening group 222 constituted by n97 to n192, the recording is performed in the (k+4)-th pass (the third scanning with respect to the unit area 232) by the ejection opening group 223 constituted by n193 to n288, and the recording is performed in the (k+5)-th pass (the fourth scanning with respect to the unit area 232) by the ejection opening group 224 constituted by n289 to n384.

Herein, the area where the quantization is performed by using all the areas of the single dither pattern Q does not exist in the area corresponding to the (j+193)-th to the (j+288)-th pixels from the downstream side in the Y direction of the quantized data.

More specifically, the area corresponding to the (j+193)-th to the (j+224)-th pixels in the area corresponding to the (j+193)-th to the (j+288)-th pixels from the downstream side in the Y direction of the quantized data is the area where the quantization is performed by the dither pattern part Q3' schematically illustrated in FIG. 12B.

Therefore, the distribution processing is executed by using the mask pattern parts A3', B3', C3', and D3' illustrated in FIG. 12A corresponding to the dither pattern part Q3' with respect to the area corresponding to the (j+193)-th to the (j+224)-th pixels from the downstream side in the Y direction of the quantized data.

The area corresponding to the (j+225)-th to the (j+256)-th pixels is the area where the quantization is performed by the dither pattern part Q4' schematically illustrated in FIG. 12B.

Therefore, the distribution processing is executed by using the mask pattern parts A4', B4', C4', and D4' illustrated in FIG. 12A corresponding to the dither pattern part Q4' with respect to the area corresponding to the (j+225)-th to the (j+256)-th pixels from the downstream side in the Y direction of the quantized data.

The area corresponding to the (j+257)-th to the (j+288)-th pixels is the area where the quantization is performed by the dither pattern part Q1' schematically illustrated in FIG. 12B.

Therefore, the distribution processing is executed by using the mask pattern parts A1', B1', C1', and D1' illustrated in FIG. 12A corresponding to the dither pattern part Q1' with respect to the area corresponding to the (j+257)-th to the (j+288)-th pixels from the downstream side in the Y direction of the quantized data.

Thereafter, the distribution processing with respect to the respective unit areas is similarly executed. That is, the distribution to the respective scanning operations is performed by using a group of the mask patterns A, B, C, and D with respect to the quantized data quantized by using all the areas in the dither pattern Q.

On the other hand, the distribution to the respective scanning operations is performed by using a group of the mask pattern parts A1', B1', C1', and D1' corresponding to the dither pattern part Q1' with respect to the quantized data quantized by using the dither pattern part Q1' corresponding to the area of the part in the dither pattern Q without using the dither pattern parts Q2', Q3', and Q4' corresponding to the area of the other parts. The distribution to the respective scanning operations is performed by using a group of the mask pattern parts A2', B2', C2', and D2' corresponding to the dither pattern part Q2' with respect to the quantized data quantized by using the dither pattern part Q2' corresponding to the area of the part in the dither pattern Q without using the dither pattern parts Q1', Q3', and Q4' corresponding to the area of the other parts. The distribution to the respective scanning operations is performed by using a group of the mask pattern parts A3', B3', C3', and D3' corresponding to the dither pattern part Q3' with respect to the quantized data quantized by using the dither pattern part Q3' corresponding to the area of the part in the dither pattern Q without using the dither pattern parts Q1', Q2', and Q4' corresponding to the area of the other parts. The distribution to the respective scanning operations is performed by using a group of the mask pattern parts A4', B4', C4', and D4' corresponding to the dither pattern part Q4' with respect to the quantized data quantized by using the dither pattern part Q4' corresponding to the area of the part in the dither pattern Q without using the dither pattern parts Q1', Q2', and Q3' corresponding to the area of the other parts.

According to the above-described configuration, even in a case where the recording is performed with the intermediation of the plurality of combinations of the conveyance amounts, it is possible to generate the recording data in which the degree of freedom at the time of the dither pattern setting is not degraded, and also the dispersibility is high.

It should be noted that the mode has been described in which the recording is performed in the area where the recording is performed at the long conveyance amount and the area where the recording is performed at the short conveyance amount in the stated order according to the present exemplary embodiment. The present exemplary embodiment can be of course applied to a mode in which the recording is performed in the area where the recording is performed at the short conveyance amount and the area where the recording is performed at the long conveyance amount in the stated order.

Third Exemplary Embodiment

According to the first and second exemplary embodiments, the case where the mask patterns A to D having substantially mutually equal recording permission ratios are used has been described.

In contrast to this, according to the present exemplary embodiment, a mode will be described in which a plurality of groups of mask patterns having mutually different recording permission ratios are prepared, and the group of applied mask patterns is varied in accordance with a position of the corresponding ejection opening group.

It should be noted that descriptions on components similar to those according to the above-described first and second exemplary embodiments will be omitted.

Mask Pattern

According to the present exemplary embodiment, three mask pattern groups including a first mask pattern group constituted by the mask patterns A1, B1, C1, and D1 corresponding to the first, second, third, and fourth scanning operations with respect to the unit area, a second mask pattern group constituted by the mask patterns A2, B2, C2, and D2 corresponding to the first, second, third, and fourth scanning operations with respect to the unit area, and a third mask pattern group constituted by the mask patterns A3, B3, C3, and D3 corresponding to the first, second, third, and fourth scanning operations with respect to the unit area are used. It should be noted that each of the mask patterns A1 to D1, A2 to D2, and A3 to D3 has the size of 128 pixels×128 pixels similarly as in the mask pattern according to the first and second exemplary embodiments.

Herein, the recording permission ratio of the mask pattern A1 belonging to the first mask pattern group is set as 5%, the recording permission ratio of the mask pattern B1 is set as 30%, the recording permission ratio of the mask pattern C1 is set as 40%, and the recording permission ratio of the mask pattern D1 is set as 25%. Therefore, the total of the recording permission ratios of the mask patterns A1 to D1 is 100%.

The recording permission ratio of the mask pattern A2 belonging to the second mask pattern group is set as 15%, the recording permission ratio of the mask pattern B2 is set as 35%, the recording permission ratio of the mask pattern C2 is set as 35%, and the recording permission ratio of the mask pattern D2 is set as 15%. Therefore, the total of the recording permission ratios of the mask patterns A2 to D2 is 100%.

Herein, the recording permission ratio of the mask pattern A3 belonging to the third mask pattern group is set as 25%, the recording permission ratio of the mask pattern B3 is set as 40%, the recording permission ratio of the mask pattern C3 is set as 30%, and the recording permission ratio of the mask pattern D3 is set as 5%. Therefore, the total of the recording permission ratios of the mask patterns A3 to D3 is 100%.

The dither pattern 80 used in the present exemplary embodiment and each of the mask patterns A1 to D1, A2 to D2, and A3 to D3 are determined while being associated with each other in a case where the grayscales of the quantized data are respectively 25%, 50%, 75%, and 100%.

Application Method of the Dither Pattern and the Mask Pattern

According to the present exemplary embodiment, similarly as in the first exemplary embodiment, the recording is performed in accordance with the multipass recording method illustrated in FIG. 5. On that basis, according to the present exemplary embodiment, the recording data is generated by using the dither pattern illustrated in FIGS. 7A and 7B and the above-described first, second, and third mask pattern groups.

As illustrated in FIGS. 7A and 7B, the dither pattern 80 according to the present exemplary embodiment has the size of 128 pixels in the Y direction. In addition, as described above, each of the mask patterns A1 to D1, A2 to D2, and A3 to D3 has the size of 128 pixels in the Y direction.

On the other hand, as schematically illustrated in FIG. 5, according to the multipass recording method according to the present exemplary embodiment, the conveyance is performed such that the conveyance amount per single conveyance becomes the length equivalent to 192 pixels. Therefore, similarly as in the first exemplary embodiment, the conveyance amount (192 pixels) is not an integer multiple of the length (128 pixels) in the Y direction of each of the mask patterns A1 to D1, A2 to D2, and A3 to D3 nor one over an integer multiple.

In view of the above, according to the present exemplary embodiment too, the mask patterns A1 to D1, A2 to D2, and A3 to D3 are divided in a manner that the conveyance amount becomes an integer multiple of the length in the Y direction in each of the plurality of mask pattern parts. Herein, since the conveyance amount is 192 pixels, for example, the mask patterns A1 to D1, A2 to D2, and A3 to D3 are divided in a manner that the length in the Y direction in each of the plurality of mask pattern parts becomes 64 (=192/3) pixels.

Figure 14A:
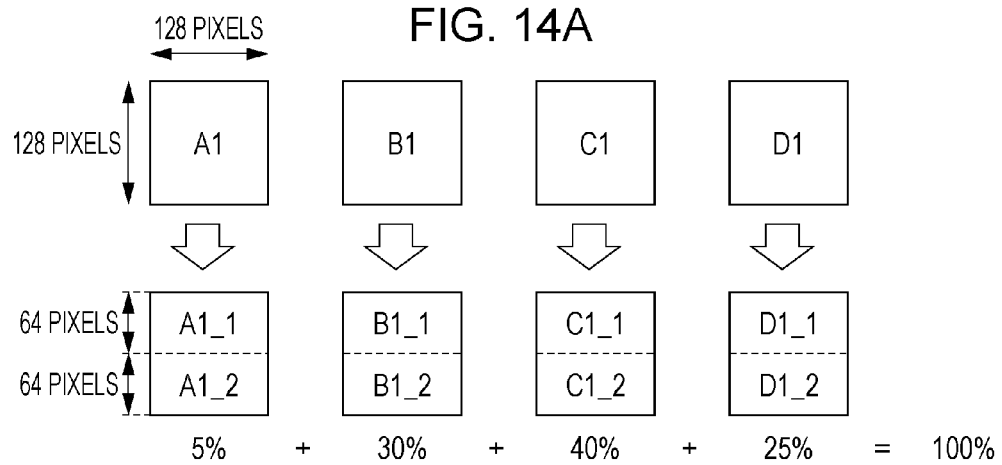
FIGS. 14A, 14B, and 14C are schematic diagrams illustrating the mask pattern parts according to the exemplary embodiment.
Figure 14B:
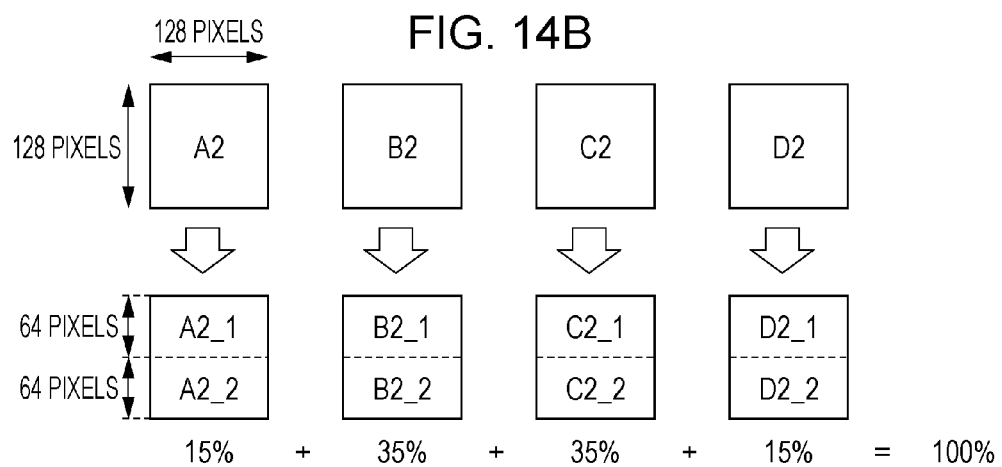
Figure 14C:
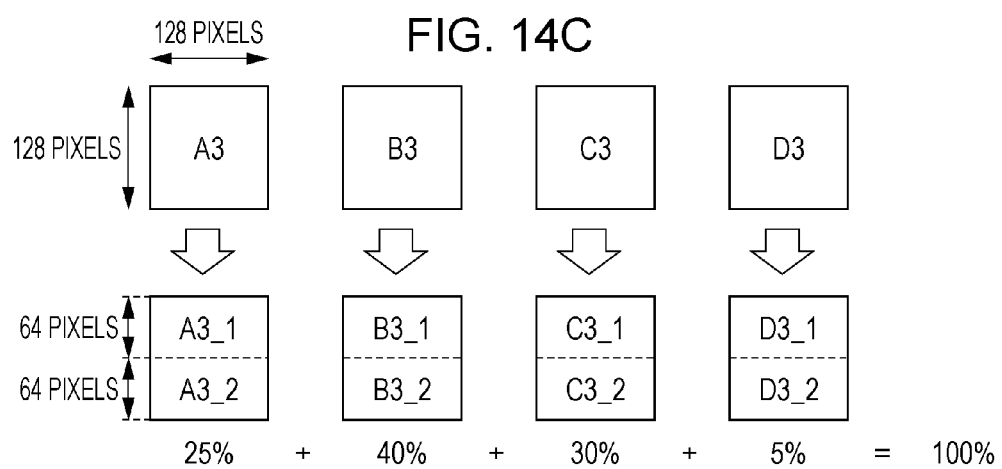

FIG. 14A schematically illustrates mask pattern parts obtained by dividing the mask patterns A1 to D1 belonging to the first mask pattern group according to the present exemplary embodiment. FIG. 14B schematically illustrates mask pattern parts obtained by dividing the mask patterns A2 to D2 belonging to the second mask pattern group according to the present exemplary embodiment. FIG. 14C schematically illustrates mask pattern parts obtained by dividing the mask patterns A3 to D3 belonging to the third mask pattern group according to the present exemplary embodiment.

According to the present exemplary embodiment as schematically illustrated in FIGS. 14A, 14B, and 14C, the mask pattern parts are obtained by dividing each of the mask patterns A1 to D1, A2 to D2, and A3 to D3 into two parts in the Y direction.

For example, the mask pattern A1 belonging to the first mask pattern group and corresponding to the first scanning is divided into a mask pattern part A1_1 that is located on the downstream side in the Y direction (corresponding to the image on the downstream side in the Y direction) and has the size of 64 pixels×128 pixels and a mask pattern part A1_2 that is located on the upstream side in the Y direction and has the size of 64 pixels×128 pixels. Herein, the mask pattern A1 is determined such that the respective recording permission ratios of the mask pattern parts A1_1 and A1_2 are set as 5%.

The mask pattern B1 belonging to the first mask pattern group and corresponding to the second scanning is divided into a mask pattern part B1_1 that is located on the downstream side in the Y direction and has the size of 64 pixels×128 pixels and a mask pattern part B1_2 that is located on the upstream side in the Y direction and has the size of 64 pixels×128 pixels. Herein, the mask pattern B1 is determined such that the respective recording permission ratios of the mask pattern parts B1_1 and B1_2 are set as 30%.

The mask pattern C1 belonging to the first mask pattern group and corresponding to the third scanning is divided into a mask pattern part C1_1 that is located on the downstream side in the Y direction and has the size of 64 pixels×128 pixels and a mask pattern part C1_2 that is located on the upstream side in the Y direction and has the size of 64 pixels×128 pixels. Herein, the mask pattern C1 is determined such that the respective recording permission ratios of the mask pattern parts C1_1 and C1_2 are set as 40%.

The mask pattern D1 belonging to the first mask pattern group and corresponding to the fourth scanning is divided into a mask pattern part D1_1 that is located on the downstream side in the Y direction and has the size of 64 pixels×128 pixels and a mask pattern part D1_2 that is located on the upstream side in the Y direction and has the size of 64 pixels×128 pixels. Herein, the mask pattern D1 is determined such that the respective recording permission ratios of the mask pattern parts D1_1 and D1_2 are set as 25%.

The mask pattern A2 belonging to the second mask pattern group and corresponding to the first scanning is divided into a mask pattern part A2_1 that is located on the downstream side in the Y direction and has the size of 64 pixels×128 pixels and a mask pattern part A2_2 that is located on the upstream side in the Y direction and has the size of 64 pixels×128 pixels. Herein, the mask pattern A2 is determined such that the respective recording permission ratios of the mask pattern parts A2_1 and A2_2 are set as 15%.

The mask pattern B2 belonging to the second mask pattern group and corresponding to the second scanning is divided into a mask pattern part B2_1 that is located on the downstream side in the Y direction and has the size of 64 pixels×128 pixels and a mask pattern part B2_2 that is located on the upstream side in the Y direction and has the size of 64 pixels×128 pixels. Herein, the mask pattern B2 is determined such that the respective recording permission ratios of the mask pattern parts B2_1 and B2_2 are set as 35%.

The mask pattern C2 belonging to the second mask pattern group and corresponding to the third scanning is divided into a mask pattern part C2_1 that is located on the downstream side in the Y direction and has the size of 64 pixels×128 pixels and a mask pattern part C2_2 that is located on the upstream side in the Y direction and has the size of 64 pixels×128 pixels. Herein, the mask pattern C2 is determined such that the respective recording permission ratios of the mask pattern parts C2_1 and C2_2 are set as 35%.

The mask pattern D2 belonging to the second mask pattern group and corresponding to the fourth scanning is divided into a mask pattern part D2_1 that is located on the downstream side in the Y direction and has the size of 64 pixels×128 pixels and a mask pattern part D2_2 that is located on the upstream side in the Y direction and has the size of 64 pixels×128 pixels. Herein, the mask pattern D2 is determined such that the respective recording permission ratios of the mask pattern parts D2_1 and D2_2 are set as 15%.

The mask pattern A3 belonging to the third mask pattern group and corresponding to the first scanning is divided into a mask pattern part A3_1 that is located on the downstream side in the Y direction and has the size of 64 pixels×128 pixels and a mask pattern part A3_2 that is located on the upstream side in the Y direction and has the size of 64 pixels×128 pixels. Herein, the mask pattern A3 is determined such that the respective recording permission ratios of the mask pattern parts A3_1 and A3_2 are set as 25%.

The mask pattern B3 belonging to the third mask pattern group and corresponding to the second scanning is divided into a mask pattern part B3_1 that is located on the downstream side in the Y direction and has the size of 64 pixels×128 pixels and a mask pattern part B3_2 that is located on the upstream side in the Y direction and has the size of 64 pixels×128 pixels. Herein, the mask pattern B3 is determined such that the respective recording permission ratios of the mask pattern parts B3_1 and B3_2 are set as 40%.

The mask pattern C3 belonging to the third mask pattern group and corresponding to the third scanning is divided into a mask pattern part C3_1 that is located on the downstream side in the Y direction and has the size of 64 pixels×128 pixels and a mask pattern part C3_2 that is located on the upstream side in the Y direction and has the size of 64 pixels×128 pixels. Herein, the mask pattern C3 is determined such that the respective recording permission ratios of the mask pattern parts C3_1 and C3_2 are set as 30%.

The mask pattern D3 belonging to the third mask pattern group and corresponding to the fourth scanning is divided into a mask pattern part D3_1 that is located on the downstream side in the Y direction and has the size of 64 pixels×128 pixels and a mask pattern part D3_2 that is located on the upstream side in the Y direction and has the size of 64 pixels×128 pixels. Herein, the mask pattern D3 is determined such that the respective recording permission ratios of the mask pattern parts D3_1 and D3_2 are set as 5%.

Herein, the mask pattern parts A1_1, B1_1, C1_1, D1_1, A2_1, B2_1, C2_1, D2_1, A3_1, B3_1, C3_1, and D3_1 are the areas set in synchronization with the dither pattern part Q1 located on the downstream side in the Y direction in the dither pattern Q. Therefore, with respect to the quantized data quantized by the dither pattern part Q1 in the quantized data, it is possible to generate the recording data such that the pixels where the ejection of the ink is specified are highly dispersed by performing the distribution processing using the mask pattern parts A1_1, B1_1, C1_1, D1_1, A2_1, B2_1, C2_1, D2_1, A3_1, B3_1, C3_1, and D3_1.

On the other hand, the mask pattern parts A1_2, B1_2, C1_2, D1_2, A2_2, B2_2, C2_2, D2_2, A3_2, B3_2, C3_2, and D3_2 are the areas set in synchronization with the dither pattern part Q2 located on the upstream side in the Y direction in the dither pattern Q. Therefore, with respect to the quantized data quantized by the dither pattern part Q2 in the quantized data, it is possible to generate the recording data such that the pixels where the ejection of the ink is specified are highly dispersed by performing the distribution processing using the mask pattern parts A1_2, B1_2, C1_2, D1_2, A2_2, B2_2, C2_2, D2_2, A3_2, B3_2, C3_2, and D3_2.

According to the present exemplary embodiment, the recording is carried out in accordance with the recording data generated by using the dither pattern illustrated in FIGS. 7A and 7B and the mask patterns and the mask pattern parts illustrated in FIGS. 14A, 14B, and 14C in the multipass recording method illustrated in FIG. 5.

Figure 15:
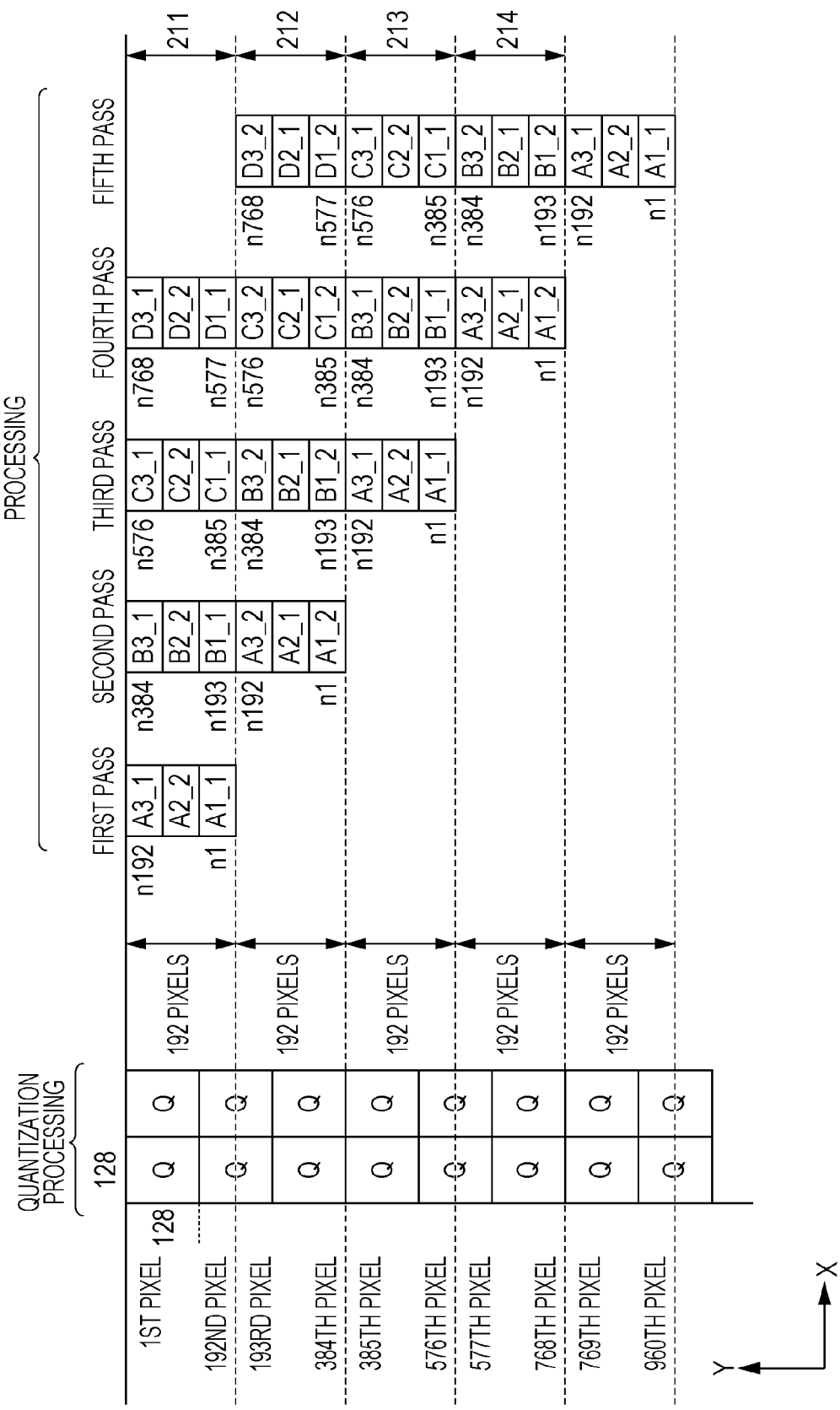
FIG. 15 is a schematic diagram illustrating the application method of the dither pattern and the mask pattern.

FIG. 15 is a schematic diagram illustrating the recording data generation process according to the present exemplary embodiment. It should be noted that, for simplicity in the following explanation, only the multi-value data located at the 1st to the 128th pixels from the upstream side in the X direction will be described.

Since the quantization processing according to the present exemplary embodiment is similar to that of the first exemplary embodiment, descriptions thereof will be omitted.

In the distribution processing in S404 according to the present exemplary embodiment, each of the ejection opening groups illustrated in FIG. 5 is further divided into three parts along the Y direction. The first mask pattern group is applied to the area in the end part on the upstream side in the Y direction in each of the ejection opening groups, the second mask pattern group applied to the area in the central part in the Y direction, and the third mask pattern group is applied to the area in the end part on the downstream side in the Y direction.

For example, the ejection opening group 201 constituted by n1 to n192 is divided into three areas including the area in the end part on the upstream side in the Y direction constituted by the ejection openings n1 to n64, the area in the central part in the Y direction constituted by the ejection openings n65 to n128, and the area in the end part on the downstream side in the Y direction constituted by the ejection openings n129 to n192. Subsequently, in a case where the quantized data corresponding to the ejection openings n1 to n64 is distributed, the distribution processing is performed by adopting the mask patterns A1 to D1 and the mask pattern parts A1_2, B1_2, C1_2, D1_2, A1_2, B1_2, C1_2, and D1_2 belonging to the first mask pattern group. In a case where the quantized data corresponding to the ejection openings n65 to n128 is distributed, the distribution processing is performed by adopting the mask patterns A2 to D2 and the mask pattern parts A2_2, B2_2, C2_2, D2_2, A2_2, B2_2, C2_2, and D2_2 belonging to the second mask pattern group. In a case where the quantized data corresponding to the ejection openings n129 to n192 is distributed, the distribution processing is performed by adopting the mask patterns A3 to D3 and the mask pattern parts A3_2, B3_2, C3_2, D3_2, A3_2, B3_2, C3_2, and D3_2 belonging to the third mask pattern group.

Similarly, in a case where the quantized data corresponding to the ejection openings n193 to n256, the ejection openings n385 to n448, and n577 to n640 is distributed, the distribution processing is performed by adopting the mask patterns A1 to D1 and the mask pattern parts A1_2, B1_2, C1_2, D1_2, A1_2, B1_2, C1_2, and D1_2 belonging to the first mask pattern group. In a case where the quantized data corresponding to the ejection openings n257 to n320, the ejection openings n449 to n512, and the ejection openings n641 to n704 is distributed, the distribution processing is performed by adopting the mask patterns A2 to D2 and the mask pattern parts A2_2, B2_2, C2_2, D2_2, A2_2, B2_2, C2_2, and D2_2 belonging to the second mask pattern group. In a case where the quantized data corresponding to the ejection openings n321 to n384, the ejection openings n513 to 576, and the ejection openings n705 to n768 is distributed, the distribution processing is performed by adopting the mask patterns A3 to D3 and the mask pattern parts A3_2, B3_2, C3_2, D3_2, A3_2, B3_2, C3_2, and D3_2 belonging to the third mask pattern group.

On that basis, in the distribution processing in S404 according to the present exemplary embodiment, with respect to the quantized data quantized by using the area of part (the dither pattern part Q1, Q2) in the dither pattern Q without using the area of the other part, the distribution to the respective scanning operations is performed by using one of the mask pattern parts A1_1, B1_1, C1_1, D1_1, A2_1, B2_1, C2_1, D2_1, A3_1, B3_1, C3_1, D3_1, A1_2, B1_2, C1_2, D1_2, A2_2, B2_2, C2_2, D2_2, A3_2, B3_2, C3_2, and D3_2 belonging to the corresponding mask pattern group and also corresponding to the area of the part.

For example, the area corresponding to the 1st to the 192nd pixels from the downstream side in the Y direction of the quantized data corresponds to the image recorded in the single unit area 211 on the recording medium. It should be noted that, as may be understood from FIG. 5, the unit area 211 is the area where the recording is performed in the first pass (the first scanning with respect to the unit area 211) by the ejection opening group 201 constituted by n1 to n192, the recording is performed in the second pass (the second scanning with respect to the unit area 211) by the ejection opening group 202 constituted by n193 to n384, the recording is performed in the third pass (the third scanning with respect to the unit area 211) by the ejection opening group 203 constituted by n385 to n576, and the recording is performed in the fourth pass (the fourth scanning with respect to the unit area 211) by the ejection opening group 204 constituted by n577 to n768.

Herein, the area corresponding to the 129th to the 192nd pixels from the downstream side in the Y direction in the area corresponding to the 1st to the 192nd pixels from the downstream side in the Y direction of the quantized data is the area corresponding to the ejection openings n1 to n64, the ejection openings n193 to n256, the ejection openings n385 to n448, and the ejection openings n577 to n640 located in the end part on the upstream side in the Y direction in the single ejection opening group. Furthermore, the area corresponding to the 129th to the 192nd pixels from the downstream side in the Y direction of the quantized data is the area where the quantization is performed by using the dither pattern part Q1.

Therefore, the distribution processing is executed by using the mask pattern parts A1_1, B1_1, C1_1, and D1_1 belonging to the first mask pattern group and also corresponding to the dither pattern part Q1 which are illustrated in FIG. 14A with respect to the area corresponding to the 129th to the 192nd pixels from the downstream side in the Y direction of the quantized data.

Next, the area corresponding to the 65th to the 128th pixels from the downstream side in the Y direction in the area corresponding to the 1st to the 192nd pixels from the downstream side in the Y direction of the quantized data is the area corresponding to the ejection openings n65 to n128, the ejection openings n257 to n320, the ejection openings n449 to n512, and the ejection openings n641 to n704 located in the central part in the Y direction in the single ejection opening group. Furthermore, the area corresponding to the 65th to the 128th pixels from the downstream side in the Y direction of the quantized data is the area where the quantization is performed by using the dither pattern part Q2.

Therefore, the distribution processing is executed by using the mask pattern parts A2_2, B2_2, C2_2, and D2_2 belonging to the second mask pattern group and also corresponding to the dither pattern part Q2 which are illustrated in FIG. 14B with respect to the area corresponding to the 65th to the 128th pixels from the downstream side in the Y direction of the quantized data.

Next, the area corresponding to the 1st to the 64th pixels from the downstream side in the Y direction in the area corresponding to the 1st to the 192nd pixels from the downstream side in the Y direction of the quantized data is the area corresponding to the ejection openings n129 to n192, the ejection openings n321 to n384, the ejection openings n513 to 576, and the ejection openings n705 to n768 located in the end part on the downstream side in the Y direction in the single ejection opening group. Furthermore, the area corresponding to the 1st to the 64th pixels from the downstream side in the Y direction of the quantized data is the area where the quantization is performed by using the dither pattern part Q1.

Therefore, the distribution processing is executed by using the mask pattern parts A3_1, B3_1, C3_1, and D3_1 belonging to the third mask pattern group and also corresponding to the dither pattern part Q1 which are illustrated in FIG. 14C with respect to the area corresponding to the 1st to the 64th pixels from the downstream side in the Y direction of the quantized data.

For example, the area corresponding to the 193rd to the 384th pixels from the downstream side in the Y direction of the quantized data corresponds to the image recorded in the single unit area 212 on the recording medium. It should be noted that, as may be understood from FIG. 5, the unit area 212 is the area where the recording is performed in the second pass (the first (initial) scanning with respect to the unit area 212) by the ejection opening group 201 constituted by n1 to n192, the recording is performed in the third pass (the second scanning with respect to the unit area 212) by the ejection opening group 202 constituted by n193 to n384, the recording is performed in the fourth pass (the third scanning with respect to the unit area 212) by the ejection opening group 203 constituted by n385 to n576, and the recording is performed in the fifth pass (the fourth (last) scanning with respect to the unit area 212) by the ejection opening group 204 constituted by n577 to n768.

Herein, the area corresponding to the 321st to the 384th pixels from the downstream side in the Y direction in the area corresponding to the 193rd to the 384th pixels from the downstream side in the Y direction of the quantized data is the area corresponding to the ejection openings n1 to n64, the ejection openings n193 to n256, the ejection openings n385 to n448, and the ejection openings n577 to n640 located in the area in the end part on the upstream side in the Y direction in the single ejection opening group. Furthermore, the area corresponding to the 321st to the 384th pixels from the downstream side in the Y direction of the quantized data is the area where the quantization is performed by using the dither pattern part Q2.

Therefore, the distribution processing is executed by using the mask pattern parts A1_2, B1_2, C1_2, and D1_2 belonging to the first mask pattern group and also corresponding to the dither pattern part Q2 which are illustrated in FIG. 14A with respect to the area corresponding to the 321st to the 384th pixels from the downstream side in the Y direction of the quantized data.

Next, the area corresponding to the 257th to the 320th pixels from the downstream side in the Y direction in the area corresponding to the 193rd to the 384th pixels from the downstream side in the Y direction of the quantized data is the area corresponding to the ejection openings n65 to n128, the ejection openings n257 to n320, the ejection openings n449 to n512, and the ejection openings n641 to n704 located in the central part in the Y direction in the single ejection opening group. Furthermore, the area corresponding to the 257th to the 320th pixels from the downstream side in the Y direction of the quantized data is the area where the quantization is performed by using the dither pattern part Q1.

Therefore, the distribution processing is executed by using the mask pattern parts A2_1, B2_1, C2_1, and D2_1 belonging to the second mask pattern group and also corresponding to the dither pattern part Q1 which are illustrated in FIG. 14B with respect to the area corresponding to the 257th to the 320th pixels from the downstream side in the Y direction of the quantized data.

Next, the area corresponding to the 193rd to the 256th pixels from the downstream side in the Y direction in the area corresponding to the 193rd to the 384th pixels from the downstream side in the Y direction of the quantized data is the area corresponding to the ejection openings n129 to n192, the ejection openings n321 to n384, the ejection openings n513 to 576, and the ejection openings n705 to n768 located in the end part on the downstream side in the Y direction in the single ejection opening group. Furthermore, the area corresponding to the 193rd to the 256th pixels from the downstream side in the Y direction of the quantized data is the area where the quantization is performed by using the dither pattern part Q2.

Therefore, the distribution processing is executed by using the mask pattern parts A3_2, B3_2, C3_2, and D3_2 belonging to the third mask pattern group and also corresponding to the dither pattern part Q2 which are illustrated in FIG. 14C with respect to the area corresponding to the 193rd to the 256th pixels from the downstream side in the Y direction of the quantized data.

Thereafter, the distribution processing with respect to the respective unit areas is similarly executed.

Herein, according to the present exemplary embodiment, in the recording in the fourth and subsequent passes, it is possible to generate the recording data by using the mask pattern part in which the recording permission ratio is set to be lower as the position is closer to the end part of the ejection opening column. Accordingly, since the ejection amount of the ink from the end part tends to be lower than the ejection amount of the ink in the central part, it is possible to perform the recording while dot misalignment of the ink ejected from the end part of the ejection opening column or the like which is an issue in a related art is suppressed.

Figure 16:
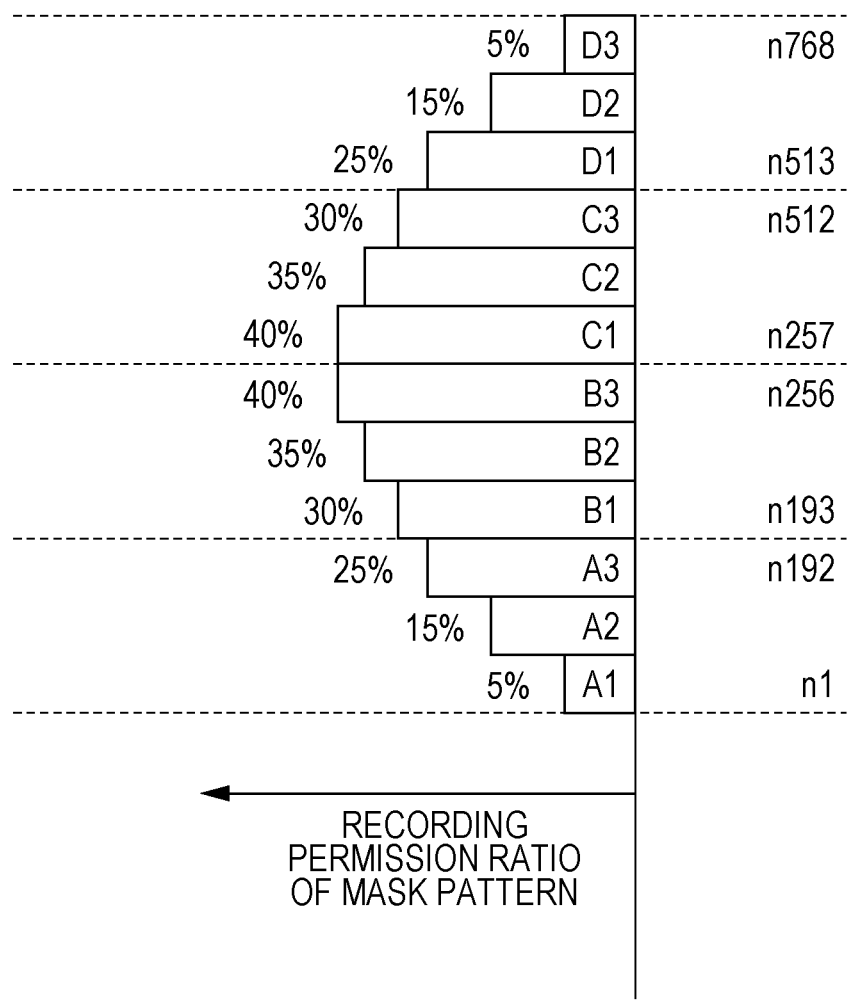
FIG. 16 is a schematic diagram for describing a distribution of a recording permission ratio.

FIG. 16 schematically illustrates the recording permission ratios of the mask pattern parts corresponding to the respective areas in the respective ejection opening groups in the recording in the fourth and subsequent passes according to the present exemplary embodiment.

As may be understood from FIG. 16, the recording amount based on a thinning pattern for every 64 ejection opening width from n1 towards n768 in the ejection opening column is 5% in A1, 15% in A2, 25% in A3, 30% in B1, 35% in B2, 40% in B3, 40% in C1, 35% in C2, 30% in C3, 25% in D1, 15% in D2, and 5% in D3. It may be understood that the recording permission ratios are lower from the central part of the ejection openings towards the end parts.

According to the above-described configuration, it is possible to generate the recording data in which the degree of freedom at the time of the setting of the dither pattern is not degraded, and also the dispersibility is high. Furthermore, since the recording permission ratio can be set to be low in the end part of the ejection opening column, it is possible to suppress the dot misalignment of the ink in the ejection from the end part or the like.

Fourth Exemplary Embodiment

According to the first to third exemplary embodiments, the mode has been described in which the multi-value data is converted into binary data represented by 1-bit 2-value information in the quantization processing, and the binary data is distributed in the distribution processing to a plurality of scanning operations to generate the binary recording data.

In contrast to this, according to the present exemplary embodiment, a mode will be described in which the quantized data is converted into M-value data represented by n-bit (n≥2) M-value (M≥3) information, and the M-value data is distributed in the distribution processing to the plurality of scanning operations to generate the binary recording data.

It should be noted that descriptions on components similar to those according to the above-described first to third exemplary embodiments will be omitted.

According to the present exemplary embodiment, the quantization processing S403 and the distribution processing S404 illustrated in FIG. 6 are varied from those according to the first to third exemplary embodiments.

It should be noted that, as an example of n-bit M-value data herein, quantized data represented by the 2-bit 4-value information ("00", "01", "10", "11") is generated in the quantization processing. Herein, the 2-bit 4-value information of the quantized data specifies the number of times to perform the ink ejection to the pixel. More specifically, in a case where the 2-bit 4-value information of the quantized data is "00", the ink is not ejected to the pixel at all. In a case where the 2-bit 4-value information of the quantized data is "01", the ink is ejected to the pixel once. In a case where the 2-bit 4-value information of the quantized data is "10", the ink is ejected to the pixel twice. In a case where the 2-bit 4-value information of the quantized data is "11", the ink is ejected to the pixel three times.

It should be noted that, for simplicity in the following explanation, the 2-bit 4-value information ("00", "01", "10", "11") indicating the number of times to perform the ink ejection will be also referred to as a pixel value.

Quantization Processing

Figure 17:
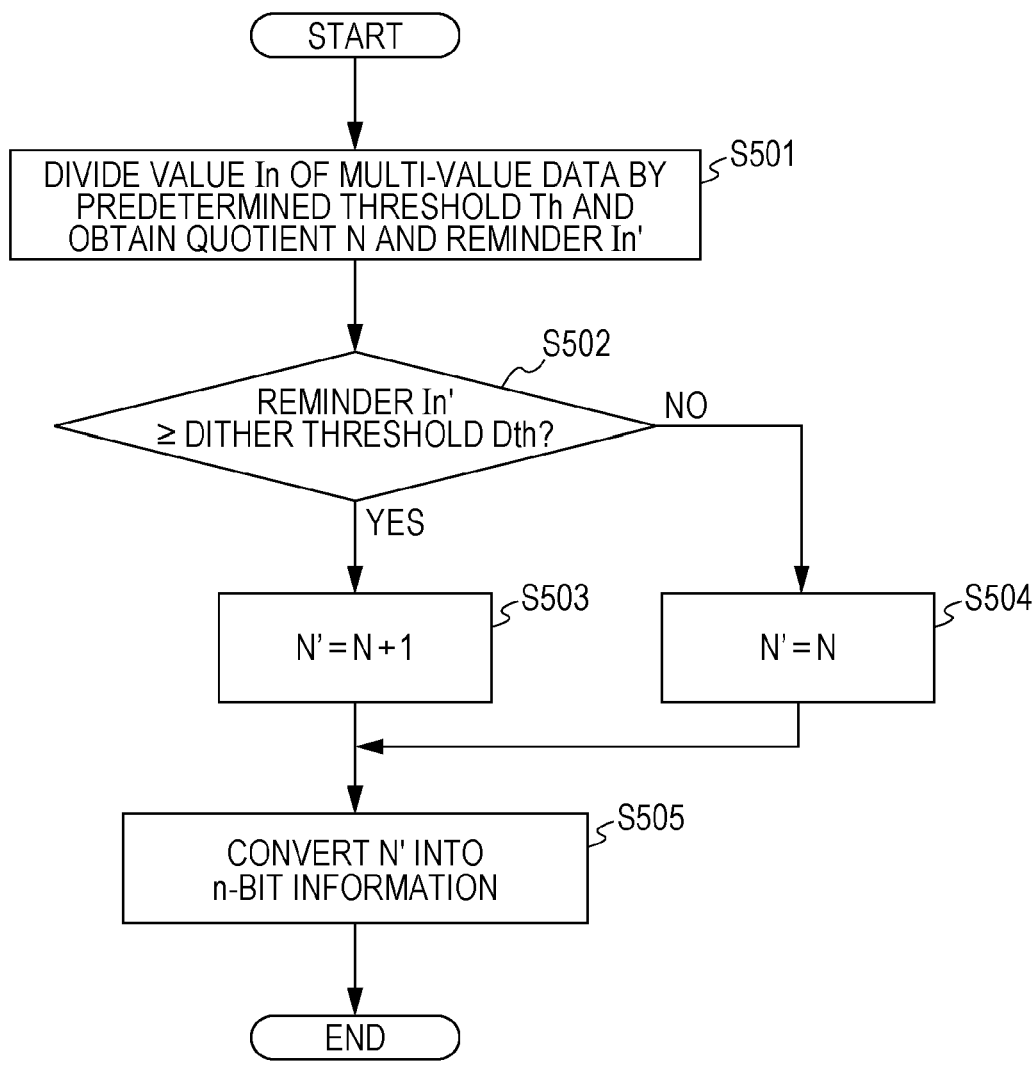
FIG. 17 illustrates a process of quantization processing according to the exemplary embodiment.

FIG. 17 is a flow chart for the quantized data generation in the quantization processing in S403 in accordance with the control program according to the present exemplary embodiment.

When the quantization processing in S403 according to the present exemplary embodiment is started, first, in step S501, a grayscale value In indicated by the multi-value data in the respective pixels is divided by a predetermined threshold Th determined in advance to calculate a quotient N and a remainder In' thereof.

Herein, in a case where the M-value quantized data is generated in the quantization processing and also the grayscale values that can be represented by the multi-value data are L stages, the predetermined threshold Th is preferably set as a value calculated by the following Expression (1).

$$Th = (L-1)/(M-1) \qquad (1)$$

As described above, M=4 is set according to the present exemplary embodiment. Since the multi-value data can represent grayscale values in 256 stages from 0 to 255, L=256 is set. Therefore, according to the present exemplary embodiment, the predetermined threshold Th=85 (=(256−1)/(4−1)) is set.

It should be noted that the calculation method for the above-described predetermined threshold Th is an example, and the threshold Th may be appropriately set by using a different method.

FIG. 18 is a table illustrating the quotient N and the reminder In' obtained in a case where the grayscale value In of the multi-value data is one of the values 0 to 255.

As illustrated in FIG. 18, in a case where the grayscale value In of the multi-value data is one of the values 0 to 84, the quotient N obtained by dividing the grayscale value In by the predetermined threshold Th=85 is 0, and the reminder In' is 0 to 84. In a case where the grayscale value In of the multi-value data is one of the values 85 to 169, the quotient N obtained by dividing the grayscale value In by the predetermined threshold Th=85 is 1, and the reminder In' is 0 to 84. In a case where the grayscale value In of the multi-value data is one of the values 170 to 254, the quotient N obtained by dividing the grayscale value In by the predetermined threshold Th=85 is 2, and the reminder In' is 0 to 84. In a case where the grayscale value In of the multi-value data is 255, the quotient N obtained by dividing the grayscale value In by the predetermined threshold Th=85 is 3, and the reminder In' is 0.

Next, a reference is made to the dither pattern in step S502, and the reminder In' obtained in step S501 is compared with a threshold Dth set in each of the pixels in the dither pattern.

Figure 19A:
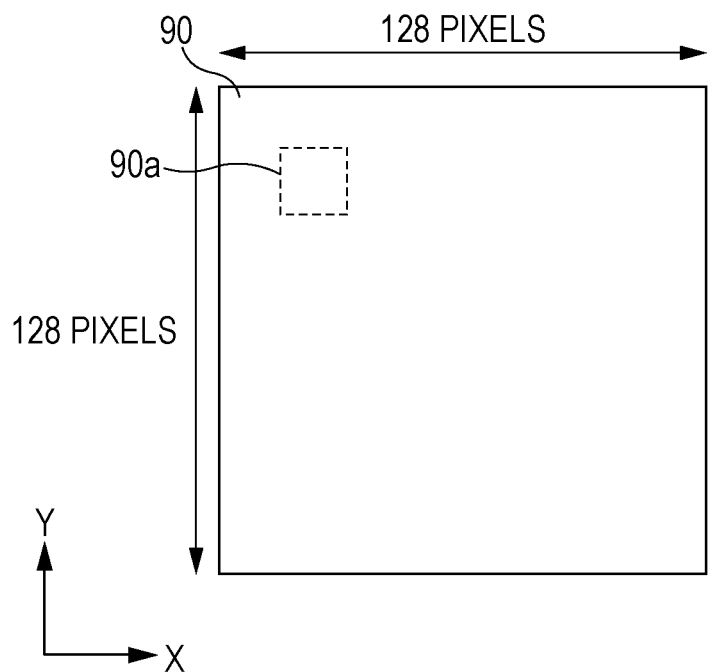
FIGS. 19A and 19B are schematic diagrams illustrating a dither pattern according to the exemplary embodiment.
Figure 19B:
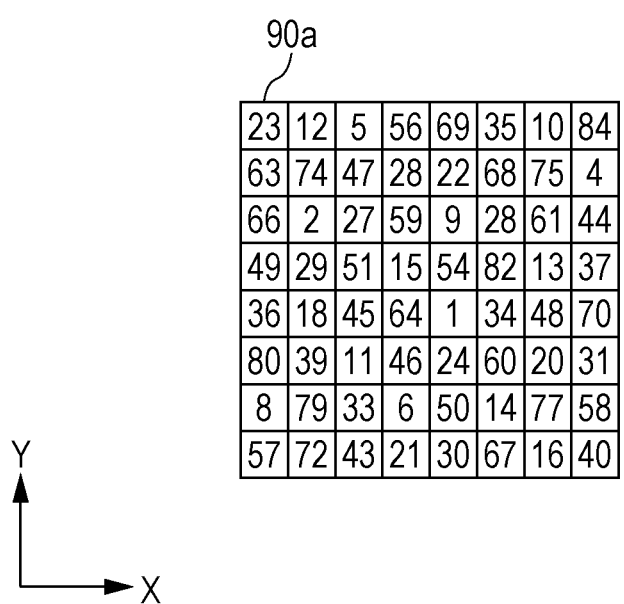

FIG. 19A schematically illustrates a dither pattern 90 used in the quantization processing according to the present exemplary embodiment. FIG. 19B is an expanded view illustrating an area 90a of part in the dither pattern illustrated in FIG. 19A. It should be noted that, according to the present exemplary embodiment, the dither pattern in which the threshold is set for determining the number of times to perform the ink ejection to each of the plurality of pixel areas is used as the dither pattern.

As illustrated in FIG. 19A, the dither pattern 90 used in the present exemplary embodiment has the size of 128 pixels in the X direction and 128 pixels in the Y direction. With respect to each of these 128×128 pixels, one of 84 values from 1 to 84 is set as the threshold of the pixel as illustrated in the expanded view of FIG. 19B.

In the quantization processing in step S403 according to the present exemplary embodiment, the reminder In' obtained on the basis of the grayscale value In indicated by the multi-value data at a certain pixel is compared with the threshold indicated by the dither pattern 90 in the corresponding pixel, and in a case where the reminder In' is higher than or equal to the threshold, the flow proceeds to step S503. Subsequently, in step S503, 1 is added to the quotient N obtained in step S502, and the resultant value is set as a grayscale value N' of the quantized data (=N+1).

On the other hand, in a case where the reminder In' is lower than the threshold, the flow proceeds to step S504, and the quotient N obtained in step 3502 is set as the grayscale value N' of the quantized data (=N).

Herein, as may be understood from FIG. 18, in a case where the grayscale value of the multi-value data is one of the values 0 to 84, the quotient N is 0, and the reminder In' is one of the values 0 to 84. Therefore, the grayscale value N' of the quantized data becomes 1 or 0 in accordance with the threshold set with respect to the corresponding pixel. Since the number of pixels where the reminder In' is higher or equal to the threshold is increased as the reminder In' is higher, the number of pixels where the grayscale value N' is set as 1 is increased.

In a case where the grayscale value of the multi-value data is one of the values 85 to 169, the quotient N is 1, and the reminder In' is one of the values 0 to 84. Therefore, the grayscale value N' of the quantized data becomes 2 or 1 in accordance with the threshold set with respect to the corresponding pixel. Since the number of pixels where the reminder In' is higher or equal to the threshold is increased as the reminder In' is higher, the number of pixels where the grayscale value N' is set as 2 is increased.

In a case where the grayscale value of the multi-value data is one of the values 170 to 254, the quotient N is 2, and the reminder In' is one of the values 0 to 84. Therefore, the grayscale value N' of the quantized data becomes 2 or 3 in accordance with the threshold set with respect to the corresponding pixel. Since the number of pixels where the reminder In' is higher or equal to the threshold is increased as the reminder In' is higher, the number of pixels where the grayscale value N' is set as 3 is increased.

In a case where the grayscale value of the multi-value data is 255, the quotient N is 3, and the reminder In' is 0. Therefore, the grayscale value of the quantized data becomes 3 irrespective of the threshold set with respect to the corresponding pixel.

In this manner, it may be understood that, as the grayscale value of the multi-value data is higher, the number of pixels where a large value is set as the grayscale value N' is increased.

Subsequently, the grayscale value N' is converted into n-bit (n≥2) information in step S505. According to the present exemplary embodiment, since n=2 is set as described above, the grayscale value N' is converted into one of the pixel values "00", "01", "10", and "11". More specifically, in the case of the grayscale value N'=0 at a certain pixel, the grayscale value N' is converted into information "00" indicating that the number of times to perform the ink ejection to the pixel is 0. In the case of the grayscale value N'=1 at a certain pixel, the grayscale value N' is converted into information "01" indicating that the number of times to perform the ink ejection to the pixel is 1. In the case of the grayscale value N'=2 at a certain pixel, the grayscale value N' is converted into information "10" indicating that the number of times to perform the ink ejection to the pixel is 2. In the case of the grayscale value N'=3 at a certain pixel, the grayscale value N' is converted into information "11" indicating that the number of times to perform the ink ejection to the pixel is 3.

FIGS. 20A to 20D schematically illustrate the quantized data generated in a case where the multi-value data having mutually different grayscale values is input to the area 90a in the dither pattern 90 illustrated in FIGS. 19A and 19B.

Figure 20A:
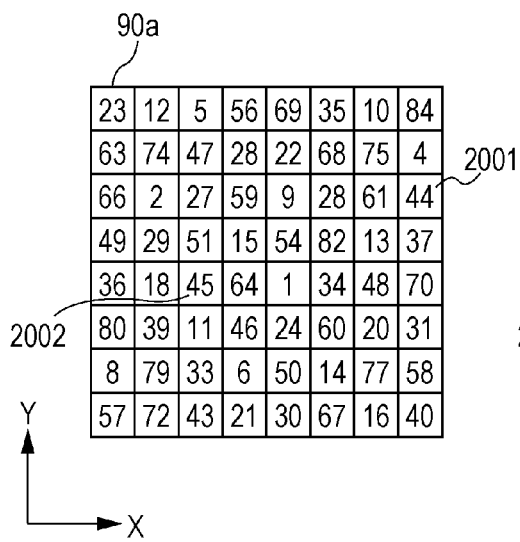
FIGS. 20A to 20D are explanatory diagrams for describing the quantization processing according to the exemplary embodiment.
Figure 20B:
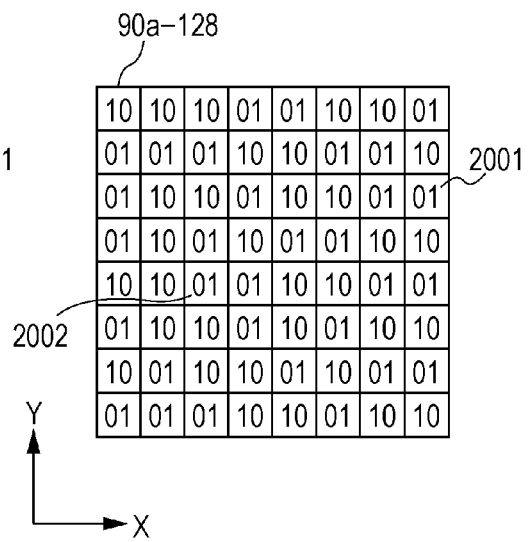
Figure 20C:
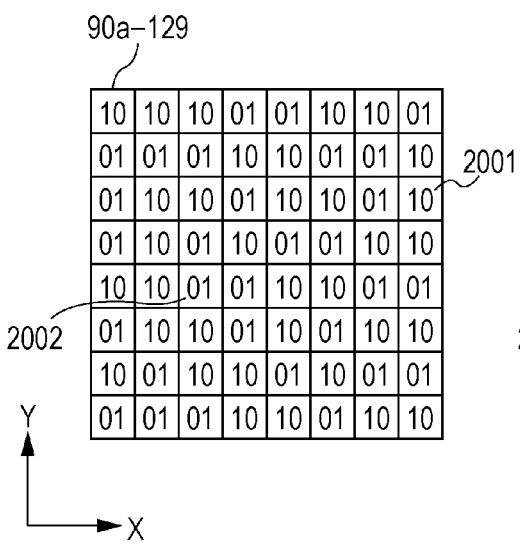
Figure 20D:
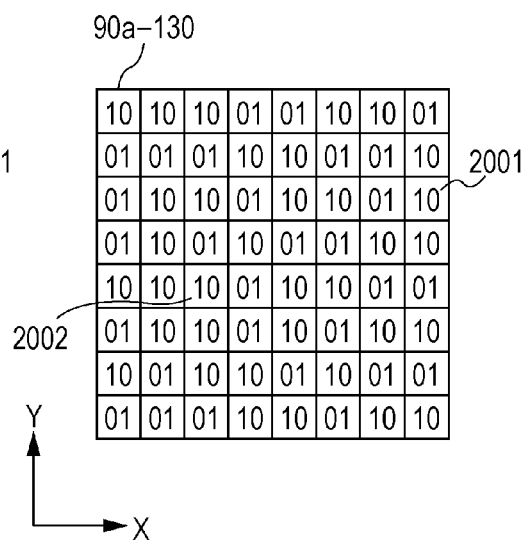

Herein, FIG. 20A illustrates the area 90a of the part in the dither pattern similarly as in the dither pattern illustrated in FIG. 19B. FIG. 20B illustrates quantized data 90a-128 generated when the multi-value data in which the grayscale value of each pixel is 128 is input to the area 90a of the part in the dither pattern 90. FIG. 20C illustrates quantized data 90a-129 generated when the multi-value data in which the grayscale value is 129 is uniformly input to the area 90a of the part in the dither pattern 90. FIG. 20D illustrates quantized data 90a-130 generated when the multi-value data in which the grayscale value is 130 is input to the area 90a of the part in the dither pattern 90.

In a case where the multi-value data in which the grayscale value In is 128 is uniformly input to the area 90a of the part in the dither pattern illustrated in FIG. 20A, the quotient N=1 and the reminder In'=43 are obtained in step S501. Therefore, in steps S502 to S504, the grayscale value N'=2 is determined in the pixel where the threshold Dth higher than or equal to 43 is set in the area 90a of the part in the dither pattern 90, the grayscale value N'=1 is determined in the pixel where the threshold Dth lower than or equal to 42 is set. Subsequently, in step S505, the pixel value "10" is assigned to the pixel where the grayscale value N'=2 is determined, and the pixel value "01" is assigned to the pixel where the grayscale value N'=1 is determined. Therefore, the M-value data as illustrated in FIG. 20B is generated.

Next, in a case where the multi-value data in which the grayscale value In is 129 is uniformly input to the area 90a of the part in the dither pattern illustrated in FIG. 20A, the quotient N=1 and the reminder In'=44 are obtained in step S501. Therefore, in steps S502 to S504, the grayscale value N'=2 is determined in the pixel where the threshold Dth higher than or equal to 44 is set in the area 90a of the part in the dither pattern 90, and the grayscale value N'=1 is determined in the pixel where the threshold Dth is lower than or equal to 43. Subsequently, in step S505, the pixel value "10" is assigned to the pixel where the grayscale value N'=2 is determined, and the pixel value "01" is assigned to the pixel where the grayscale value N'=1 is determined. Therefore, the M-value data as illustrated in FIG. 20C is generated.

Herein, the same pixel value is set in pixel other than pixels 2001 in the M-value data illustrated in FIGS. 20B and 20C. However, it may be understood that the pixel value "01" indicating that the ink is ejected once to the pixels 2001 is set in the M-value data illustrated in FIG. 20B, whereas the pixel value "10" indicating that the ink is ejected twice to the pixels 2001 is set in the M-value data illustrated in FIG. 20C. From this, it may be understood that the ink can be ejected to the area on the recording medium corresponding to the area 90a of the part in the dither pattern 90 in a case where the multi-value data in which the grayscale value is 129 is input once more than the number of times to perform the ink ejection in a case where the multi-value data in which the grayscale value is 128 is input.

Next, in a case where the multi-value data in which the grayscale value In is 130 is input to the area 90*a* of the part in the dither pattern illustrated in FIG. 20A, the quotient N=1 and the reminder In'=45 are obtained in step S501. Therefore, in steps S502 to S504, the grayscale value N'=2 is determined in the pixel where the threshold Dth higher than or equal to 45 is set in the area 90*a* of the part in the dither pattern 90, the grayscale value N'=1 is determined in the pixel where the threshold Dth higher than or equal to 44 is set. Subsequently, in step S505, the pixel value "10" is assigned to the pixel where the grayscale value N'=2 is determined, and the pixel value "01" is assigned to the pixel where the grayscale value N'=1 is determined. Therefore, the M-value data as illustrated in FIG. 20D is generated.

Herein, the same pixel value is set in pixels other than pixels 2002 in the M-value data illustrated in FIGS. 20C and 20D. However, it may be understood that the pixel value "01" indicating that the ink is ejected once to the pixels 2002 is set in the M-value data illustrated in FIG. 20C, whereas the pixel value "10" indicating that the ink is ejected twice to the pixels 2002 is set in the M-value data illustrated in FIG. 20D. From this, it may be understood that the ink can be ejected to the area on the recording medium corresponding to the area 90*a* of the part in the dither pattern 90 in a case where the multi-value data in which the grayscale value is 130 is input once more than the number of times to perform the ink ejection in a case where the multi-value data in which the grayscale value is 129 is input.

In this manner, in the quantization processing according to the present exemplary embodiment, it is possible to generate the quantized data in which the number of times to perform the ink ejection is increased as the grayscale value indicated by the multi-value data is higher.

Distribution Processing

The quantized data is distributed to the plurality of scanning operations by applying a plurality of mask patterns, in which the number of times to permit the ink ejection is specified with respect to a plurality of respective pixel areas, to the n-bit (n≥2) M-value (M≥3) quantized data generated in the above-described quantization processing.

FIGS. 21A, 21B, 21C1, 21C2, 21C3, 21C4, 21D1, 21D2, 21D3, 21D4, and 21E are explanatory diagrams for describing a process of generating the recording data by using the quantized data each having 2-bit information and the mask patterns in which the number of times to permit the ink ejection is specified. FIG. 22 illustrates a decode table used at the time of the generation of the recording data illustrated in FIGS. 21A, 21B, 21C1, 21C2, 21C3, 21C4, 21D1, 21D2, 21D3, 21D4, and 21E.

FIG. 21A schematically illustrates 16 pixels 700 to 715 in a certain area. It should be noted that, for simplicity, the description will be given by using the pixel constituted by the pixel area equivalent to the 16 pixels herein.

FIG. 21B illustrates an example of the quantized data corresponding to the unit area.

Herein, a case of n=2 will be described as an example according to the present exemplary embodiment. In a case where 2-bit information (pixel value) constituting the multi-value data corresponding to a certain pixel is "00" according to the present exemplary embodiment as described above, the ink is not ejected to the pixel at all. In a case where the pixel value is "01", the ink is ejected to the corresponding pixel once. In a case where the pixel value is "10", the ink is ejected to the corresponding pixel twice. In a case where the pixel value is "11", the ink is ejected to the corresponding pixel three times.

With regard to the multi-value data illustrated in FIG. 21B, for example, since the pixel value of the pixels 703, 707, 711, and 715 is "00", the ink is not ejected to the pixel area corresponding to the pixels 703, 707, 711, and 715 at all. For example, since the pixel value of the pixels 700, 704, 708, and 712 is "11", the ink is ejected to the pixel area corresponding to the pixels 700, 704, 708, and 712 three times.

FIGS. 21C1, 21C2, 21C3, and 21C4 respectively correspond to the first to fourth scanning operations and illustrate examples of the mask patterns applied to the multi-value data illustrated in FIG. 21B. That is, a mask pattern 505 corresponding to the first scanning illustrated in FIG. 21C1 is applied to the multi-value data illustrated in FIG. 21B to generate recording data used in the first scanning. Similarly, mask patterns 506, 507, and 508 respectively illustrated in FIGS. 21C2, 21C3, and 21C4 are applied to the multi-value data illustrated in FIG. 21B to respectively generate recording data used in the second, third, and fourth scanning operations.

Herein, one of "00", "01", "10", and "11" is assigned to each of the pixels in the mask patterns respectively illustrated in FIGS. 21C1, 21C2, 21C3, and 21C4 as a value indicated by the 2-bit information (hereinafter, will be also referred to as a code value).

Herein, it may be understood by making a reference to the decode table illustrated in FIG. 22 that, in a case where the code value is "00", the ink is not ejected even when the pixel value of the corresponding pixel is one of "00", "01", "10", and "11". That is, this case corresponds to a state in which the code value "00" in the mask pattern does not permit the ejection of the ink at all (the number of times to permit the ink ejection is 0). In the following explanation, the pixel in the mask pattern to which the code value "00" is assigned is also referred to as a recording prohibition pixel.

On the other hand, it may be understood by making a reference to the decode table illustrated in FIG. 22 that, in a case where the code value is "01", the ink is not ejected when the pixel value of the corresponding pixel is "00", "01", or "10", but the ink is ejected when the pixel value is "11". In other words, this case corresponds to a state in which the code value "01" permits the ejection of the ink only once (the number of times to permit the ink ejection is 1) with respect to the four combinations of the pixel values ("00", "01", "10", and "11").

In a case where the code value is "10", the ink is not ejected when the pixel value of the corresponding pixel is "00" or "01", but the ink is ejected when the pixel value is "10" or "11". That is, this case corresponds to a state in which the code value "10" permits the ejection of the ink twice (the number of times to permit the ink ejection is 2) with respect to the four combinations of the pixel values.

Furthermore, in a case where the code value is "11", the ink is not ejected when the pixel value of the corresponding pixel is "00", but the ink is ejected when the pixel value is "01", "10", or "11". That is, this case corresponds to a state in which the code value "11" permits the ejection of the ink three times (the number of times to permit the ink ejection is 3) with respect to the four combinations of the pixel values. It should be noted that, in the following explanation, the pixel in the mask pattern to which the code value "01", "10", or "11" is assigned is also referred to as a recording permission pixel.

Herein, the mask pattern including the n-bit information used in the present exemplary embodiment is set on the basis of the following Condition 1 and Condition 2.

Condition 1

Herein, a setting is established in which $((2^m)-1)$ pieces of recording permission pixels are arranged in a plurality of pixels located in the same position in a plurality of mask patterns. The $((2^m)-1)$ recording permission pixels permit mutually different numbers to perform the ejection of the ink. More specifically, since m=2 is set according to the present exemplary embodiment, one of the code values "01", "10", and "11" is assigned one each to 3 $(=2^2-1)$ pixels among the four pixels located in the same position in the four mask patterns illustrated in FIGS. 21C1, 21C2, 21C3, and 21C4 (recording permission pixels), and the code value "00" is assigned to the remaining 1 (=4–3) pixel (recording prohibition pixel).

For example, with respect to the pixel 700, the code value "01" is assigned in the mask pattern illustrated in FIG. 21C3, the code value "10" is assigned in the mask pattern illustrated in FIG. 21C2, and the code value "11" is assigned in the mask pattern illustrated in FIG. 21C1. The code value "00" is assigned to the pixel 700 in the remaining mask pattern illustrated in FIG. 21C4. In other words, the pixel 700 is the recording permission pixel in the mask patterns illustrated in FIGS. 21C1, 21C2, and 21C3, and the pixel 700 is the recording prohibition pixel in the mask pattern illustrated in FIG. 21C4.

With respect to the pixel 701, the code value "01" is assigned in the mask pattern illustrated in FIG. 21C2, the code value "10" is assigned in the mask pattern illustrated in FIG. 21C1, and the code value "11" is assigned in the mask pattern illustrated in FIG. 21C4. The code value "00" is assigned to the pixel 701 in the remaining mask pattern illustrated in FIG. 21C3. In other words, the pixel 701 is the recording permission pixel in the mask patterns illustrated in FIGS. 21C1, 21C2, and 21C4, and the pixel 701 is the recording prohibition pixel in the mask pattern illustrated in FIG. 21C3.

With the above-described configuration, it is possible to generate the recording data in which, even when the pixel value at a certain pixel is one of "00", "01", "10", and "11", the ink is ejected to the pixel area only corresponding to the pixel the number of times to perform the ink ejection corresponding to the pixel value.

Condition 2

The mutually substantially equal number of recording permission pixels corresponding to the code value "01" are arranged in the mask patterns respectively illustrated in FIGS. 21C1, 21C2, 21C3, and 21C4. More specifically, the code value "01" is assigned to the four pixels including the pixels 702, 707, 708, and 713 in the mask pattern illustrated in FIG. 21C1. The code value "01" is assigned to the four pixels including the pixels 701, 706, 711, and 712 in the mask pattern illustrated in FIG. 21C2. The code value "01" is assigned to the four pixels including the pixels 700, 705, 710, and 715 in the mask pattern illustrated in FIG. 21C3. The code value "01" is assigned to the four pixels including the pixels 703, 704, 709, and 714 in the mask pattern illustrated in FIG. 21C4. That is, the four recording permission pixels corresponding to the code value "01" are arranged in each of the four mask patterns respectively illustrated in FIGS. 21C1, 21C2, 21C3, and 21C4.

Similarly, the mutually same number of recording permission pixels corresponding to the code value "10" are arranged in the mask patterns respectively illustrated in FIGS. 21C1, 21C2, 21C3, and 21C4. Furthermore, the mutually same number of recording permission pixel corresponding to the code value "11" are also arranged in the mask patterns respectively illustrated in FIGS. 21C1, 21C2, 21C3, and 21C4.

It should be noted that the case has been described herein in which the mutually equal number of recording permission pixels corresponding to each of the code values "01", "10", and "11" in the respective mask patterns are arranged, but in actuality, the mutually substantially equal number of recording permission pixels may be arranged.

Accordingly, when the multi-value data is distributed to the four scanning operations to generate the recording data by using the mask patterns respectively illustrated in FIGS. 21C1, 21C2, 21C3, and 21C4, it is possible to mutually substantially equalize recording rates in the respective four scanning operations.

FIGS. 21D1, 21D2, 21D3, and 21D4 each illustrate recording data generated by applying the mask patterns respectively illustrated in FIGS. 21C1, 21C2, 21C3, and 21C4 to the multi-value data illustrated in FIG. 21B.

For example, the pixel value of the multi-value data is "11", and the code value of the mask pattern is "11" in the pixel 700 in the recording data corresponding to the first scanning illustrated in FIG. 21D1. For this reason, as may be understood from the decode table illustrated in FIG. 22, the ejection of the ink ("1") is specified in the pixel 700. Since the pixel value of the multi-value data is "10", and the code value of the mask pattern is "10", the ejection of the ink ("1") is specified in the pixel 701. Since the pixel value of the multi-value data is "11", and the code value of the mask pattern is "00", the non-ejection of the ink ("0") is specified in the pixel 704.

The ink is ejected in the first to fourth scanning operations in accordance with the thus generated recording data respectively illustrated in FIGS. 21D1, 21D2, 21D3, and 21D4. For example, as may be understood from the recording data illustrated in FIG. 21D1, the ink is ejected to the pixel areas on the recording medium corresponding to the pixels 700, 701, 705, 708, 710, and 712 in the first scanning.

FIG. 21E illustrates logical sums of the recording data respectively illustrated in FIGS. 21D1, 21D2, 21D3, and 21D4. While the ink is ejected in accordance with the recording data respectively illustrated in FIGS. 21D1, 21D2, 21D3, and 21D4, the ink is ejected to the pixel areas corresponding to the respective pixels the number of times indicated in FIG. 21E.

For example, in the pixel 700, the ejection of the ink is specified in the recording data corresponding to the first, second, and third scanning operations illustrated in FIGS. 21D1, 21D2, and 21D3. Therefore, as illustrated in FIG. 21E, the ink is ejected to the pixel area corresponding to the pixel 700 three times in total.

In the pixel 701, the ejection of the ink is specified in the recording data corresponding to the first and fourth scanning operations illustrated in FIGS. 21D1 and 21D4. Therefore, as illustrated in FIG. 21E, the ink is ejected to the pixel area corresponding to the pixel 701 twice in total.

When the recording data illustrated in FIG. 21E is compared with the multi-value data illustrated in FIG. 21B, it may be understood that the recording data is generated such that the ink is ejected the number of times to perform the ink ejection corresponding to the pixel value of the multi-value data in each of the pixels. For example, in the pixels 700, 705, 708, and 712, the pixel value of the multi-value data illustrated in FIG. 21B is "11", and the number of times to perform the ink ejection indicated by the logical sum of the generated recording data is also 3.

According to the above-described configuration, it is possible to generate the 1-bit recording data used in each of the plurality of scanning operations on the basis of the multi-value data having the plural-bit information and the mask pattern.

The mask patterns actually used in the present exemplary embodiment will be described in detail with reference to FIGS. 23A1, 23A2, 23B1, 23B2, 23C1, 23C2, 23D1, and 23D2.

FIG. 23A1 schematically illustrates a mask pattern 91 corresponding to the first scanning with respect to the unit area used in the distribution processing according to the present exemplary embodiment. FIG. 23A2 is an expanded view illustrating an area 91a of part in the mask pattern 91.

FIG. 23B1 schematically illustrates a mask pattern 92 corresponding to the second scanning with respect to the unit area used in the distribution processing according to the present exemplary embodiment. FIG. 23B2 is an expanded view illustrating an area 92a of part in the mask pattern 92.

FIG. 23C1 schematically illustrates a mask pattern 93 corresponding to the third scanning with respect to the unit area used in the distribution processing according to the present exemplary embodiment. FIG. 23C2 is an expanded view illustrating an area 93a of part in the mask pattern 93.

FIG. 23D1 schematically illustrates a mask pattern 94 corresponding to the fourth scanning with respect to the unit area used in the distribution processing according to the present exemplary embodiment. FIG. 23D2 is an expanded view illustrating an area 94a of part in the mask pattern 94.

As illustrated in FIGS. 23A1, 23B1, 23C1, and 23D1, each of the mask patterns 91 to 94 used in the present exemplary embodiment has the size of 128 pixels in the X direction and 128 pixels in the Y direction. This is the same size as the dither pattern 90 illustrated in FIGS. 20A to 20D used in the present exemplary embodiment. As illustrated in the expanded views of FIGS. 23A2, 23B2, 23C2, and 23D2, information (code value) indicating the number of times to permit the recording to each pixel is specified with respect to each of these 128×128 pixels. The code value ("00", "01", "10", "11") to each pixel has a definition similar to the above-described definition and corresponds to the number of times to permit the ink ejection as illustrated in the decode table illustrated in FIG. 22.

Herein, the recording permission pixels are arranged at mutually complementary and exclusive positions in the mask patterns 91 to 94 illustrated in FIGS. 23A1, 23A2, 23B1, 23B2, 23C1, 23C2, 23D1, and 23D2. That is, with respect to the respective pixels, the prohibition to perform the ink ejection is specified in one mask pattern among the four mask patterns 91 to 94 ("00"), the permission to perform the ink ejection once is specified in another mask pattern ("01"), the permission to perform the ink ejection twice is specified in another mask pattern ("10"), and the permission to perform the ink ejection three times is specified in another mask pattern ("11").

Accordingly, for example, in a case where the quantized data specifying that the ink is ejected once is input to all of the 128×128 pixels corresponding to the mask patterns 91 to 94, the ink can be ejected to the respective pixel areas in one scanning operation among the first to fourth scanning operations. In a case where the quantized data specifying that the ink is ejected twice is input to all of the 128×128 pixels corresponding to the mask patterns 91 to 94, the ink can be ejected to the respective pixel areas in two scanning operations among the first to fourth scanning operations. In a case where the quantized data specifying that the ink is ejected three times is input to all of the 128×128 pixels corresponding to the mask patterns 91 to 94, the ink can be ejected to the respective pixel areas in three scanning operations among the first to fourth scanning operations.

The mask patterns 91 to 94 illustrated in FIGS. 23A1, 23A2, 23B1, 23B2, 23C1, 23C2, 23D1, and 23D2 are determined to have the mutually substantially same number of pixels where the code value "01" is set. Accordingly, for example, in a case where the quantized data specifying that the ink is ejected once (the pixel value is "01") is input to all of the 128×128 pixels corresponding to the mask patterns 81 to 84, the number of times to perform the ink ejection in each of the first to fourth scanning operations can be set as substantially the same. Similarly, the mask patterns are determined to have the mutually substantially same number of pixels where the code value "10" is set. Furthermore, the mask patterns are determined to have the mutually substantially same number of pixels where the code value "11" is set.

It should be noted that the above-described mask pattern is an example of mask patterns to which the present exemplary embodiment can be applied, and a different mask pattern can be appropriately set by taking other elements into account.

Synchronization of the Dither Pattern and the Mask Pattern

According to the present exemplary embodiment, recording data is generated by using the dither pattern 90 illustrated in FIGS. 19A and 19B and the mask patterns 91 to 94 illustrated in FIGS. 23A1, 23A2, 23B1, 23B2, 23C1, 23C2, 23D1, and 23D2. Herein, similarly as in the first to third exemplary embodiments, the dither pattern 90 and each of the mask patterns 91 to 94 are determined while being associated with each other.

More specifically, according to the present exemplary embodiment, in a case where the multi-value data specifying the grayscale value of 64 (=256×0.25) corresponding to the 25% grayscale value is quantized by using the dither pattern 90, and the generated quantized data is distributed to the first scanning by using the mask pattern 91, the dither pattern 90 and the mask pattern 91 are determined while being associated with each other such that the dispersibility of the pixels where the ejection of the ink is specified by the generated recording data corresponding to the first scanning is set to be high to some extent. That is, the dither pattern 90 and the mask pattern 91 are determined such that it is possible to generate the recording data in which the pixels where the ejection of the ink is specified spatially evenly exist as illustrated in FIG. 1C1 instead of the recording data in which the pixels where the ejection of the ink is specified have the conspicuous spatial deviation as illustrated in FIG. 1B1.

Furthermore, according to the present exemplary embodiment, in a case where the multi-value data specifying the grayscale value of 128 (=256×0.5) corresponding to the 50% grayscale value, the multi-value data specifying the grayscale value of 192 (=256×0.75) corresponding to the 75% grayscale value, and the multi-value data specifying the grayscale value of 256 (=256×1) corresponding to the 100% grayscale value are respectively similarly input, the dither pattern 90 and the mask pattern 91 are determined while being associated with each other such that the dispersibility of the pixels where the ejection of the ink is specified by the generated recording data corresponding to the first scanning is set to be high to some extent.

In addition, the synchronization of the mask pattern 91 and the dither pattern 90 corresponding to the first scanning has been described herein, and the mask pattern 92 corresponding to the second scanning, the mask pattern 93 corresponding to the third scanning, and the mask pattern 94 corresponding to the fourth scanning are respectively similarly synchronized with the dither pattern 90.

Therefore, the dither pattern 90 and each of the mask patterns 91 to 94 used in the present exemplary embodiment are determined while being associated with each other at the respective grayscale values of 25%, 50%, 75%, and 100%.

Even in a case where the dither pattern 90 and the mask patterns 91 to 94 described above are used, it is possible to attain the advantages as described in the first to third exemplary embodiments. That is, the mask pattern is divided to generate the mask pattern parts, and the mask pattern part corresponding to the area of the part in the dither pattern 90 is applied to the quantized data quantized by using the area of the part without using the area of the other part, so that it is possible to generate the recording data having the high dispersibility without decreasing the degree of freedom at the time of the dither pattern setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition, according to the above-described respective exemplary embodiments, the case has been described where the length in the Y direction of the dither pattern is the size of 128 pixels×128 pixels which is shorter than the conveyance amount at which the recording medium is conveyed, but the exemplary embodiment can also be carried out on the basis of another mode. For example, the length may be longer than the conveyance amount, such as the size of 256 pixels×256 pixels or 512 pixels×512 pixels.

In addition, the mode has been described in which the mask pattern according to the above-described respective exemplary embodiments has the size of 128 pixels×128 pixels which is the same as that of the dither pattern, but the exemplary embodiment can also be carried out on the basis of another mode. For example, the size of the mask pattern may be p times as long as that of the dither pattern in the X direction and q times as long as that of the dither pattern in the Y direction (p and q are an integer).

In addition, according to the above-described respective exemplary embodiments, the mode has been described in which the dither pattern that specifies ejection/non-ejection of the ink in accordance with the grayscale value of the multi-value data or the dither pattern that specifies the number of times to perform the ink ejection in accordance with the grayscale value of the multi-value data is used as the quantization pattern, but the exemplary embodiment can also be carried out on the basis of another mode. For example, a mode may be adopted in which a dot arrangement pattern that specifies the number of times to eject the ink and the position in accordance with the grayscale value of the multi-value data is used as the quantization pattern.

Moreover, according to the above-described respective exemplary embodiments, the mode has been described in which the distribution processing is performed by using the mask pattern instead of the mask pattern part with respect to the area where the quantization is executed by using all the areas of the dither pattern in the quantized data, but the exemplary embodiment can also be carried out on the basis of another mode. For example, a mode may be adopted in which the distribution processing is executed by applying a plurality of corresponding mask pattern parts even to the area where the quantization is executed by using all the areas of the dither pattern in the quantized data.

Furthermore, the image recording method using the image recording apparatus has been described according to the respective exemplary embodiments, but the exemplary embodiment can also be applied to a mode in which an image processing apparatus or an image processing method for generating the data to perform the image recording method according to respective exemplary embodiments or a program is separately prepared in addition to the image recording apparatus. In addition, the exemplary embodiment can of course be applied to a mode in which the above-described program is provided to part of the image recording apparatus.

With the image processing apparatus and the image processing method according to the exemplary embodiment of the present invention, it is possible to generate the recording data by using the quantization pattern and the mask pattern which are associated with each other without degrading the degree of freedom in the setting of the quantization pattern.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-107877, filed May 27, 2015, which is hereby incorporated by reference herein in its entirety.

What is claimed is:

1. An image processing apparatus for generating recording data used for each of a plurality of relative scanning operations of a recording head in an intersecting direction that intersects with a predetermined direction with respect to a unit area on a recording medium, the recording head including an ejection opening column having a plurality of ejection openings for ejecting ink arranged in the predetermined direction, the recording data specifying ejection or non-ejection of the ink to each of a plurality of pixel areas in the unit area on a recording medium corresponding to a plurality of pixels of the recording data, the image processing apparatus comprising:

one or more memories configured to store a dither pattern and a plurality of mask patterns corresponding to the plurality of relative scanning operations, wherein each pixel area in the dither pattern has a respective threshold value for specifying ejection of ink to a corresponding pixel area on the recording medium, wherein each pixel area in each of the plurality of mask patterns has respective information indicating permission or prohibition of ejection of ink to a corresponding pixel area on the recording medium, wherein a number of pixel areas of the unit area corresponding to a conveyance amount between two sequential scanning operations is greater than a number of pixel areas in the dither pattern in the predetermined direction, the number of the pixel areas of the unit area corresponding to the conveyance amount being different from an integer multiple of the number of the pixel areas in the dither pattern in the predetermined direction, and wherein the number of the pixel areas of the unit area corresponding to the conveyance amount is greater than a number of pixel areas in each of the plurality of mask patterns in the predetermined direction, the number of the pixel areas of the unit area corresponding to the conveyance amount being different from an integer multiple of the number of the pixel areas in the each of the plurality of mask patterns in the predetermined direction; and one or more processors configured to execute the following steps of:

obtaining multi-value data corresponding to an image to be recorded in the unit area;

quantizing the multi-valued data by applying the dither pattern repeatedly in the predetermined direction to generate quantized data, wherein the quantizing the multi-valued data includes (i) generating a first area of the quantized data using a first part in the dither pattern without using a second part in the dither pattern, and (ii) generating a second area of the quantized data using the entire dither pattern, the second area of the quantized data being different from the first area of the quantized data; and distributing the quantized data to the plurality of scanning operations by using the plurality of mask patterns to generate the recording data, wherein each of the plurality of mask patterns is associated with the dither pattern, and wherein the distributing the quantized data includes (i) applying, to the first area of the quantized data, a first part in each of the plurality of mask patterns without using a second part in the each of the plurality of mask patterns, and (ii) applying, to the second area of the quantized data, each of the plurality of mask patterns.

2. The image processing apparatus according to claim 1, further comprising:

a conveyance unit configured to convey the recording medium in the predetermined direction by a first distance during the plurality of scanning operations of the recording head, wherein a length of the quantization pattern in the predetermined direction is different from an integer multiple of the first distance and is also different from one over an integer multiple of the first distance.

3. The image processing apparatus according to claim 2, wherein the conveyance unit further conveys the recording medium in the predetermined direction by a second distance that is shorter than the first distance during the plurality of scanning operations of the recording head, and wherein the length of the quantization pattern in the predetermined direction is different from an integer multiple of the second distance and is also different from one over an integer multiple of the second distance.

4. The image processing apparatus according to claim 3, wherein the conveyance unit conveys the recording medium by the first distance in a case where the recording head is located in a central part in the predetermined direction on the recording medium and conveys the recording medium by the second distance in a case where the recording head is located in an end part in the predetermined direction on the recording medium.

5. The image processing apparatus according to claim 1, wherein a threshold for specifying ejection or non-ejection of the ink to each of the plurality of pixel areas is set with respect to each of the plurality of pixels in the dither pattern, and wherein permission or prohibition of the ink ejection to each of the plurality of pixel areas is specified with respect to each of the plurality of pixels in each of the plurality of mask patterns.

6. The image processing apparatus according to claim 1, wherein a threshold for specifying the number of times to perform the ink ejection to each of the plurality of pixel areas is set with respect to each of the plurality of pixels in the dither pattern, and wherein the number of times to permit the ink ejection to each of the plurality of pixel areas is set with respect to each of the plurality of pixels in each of the plurality of mask patterns.

7. The image processing apparatus according to claim 1, wherein, in a case where a value indicated by the multi-value data is a first value, the dither pattern and a predetermined mask pattern among the plurality of mask patterns are determined in a manner that an arrangement of dots based on the recording data generated on the basis of the quantized data and the predetermined mask pattern does not exhibit white noise characteristics.

8. The image processing apparatus according to claim 7, wherein, in a case where the value indicated by the multi-value data is the first value, the dither pattern and the predetermined mask pattern are determined in a manner that the arrangement of the dots based on the recording data generated on the basis of the quantized data and the predetermined mask pattern does not exhibit red noise characteristics.

9. The image processing apparatus according to claim 8, wherein, in a case where the value indicated by the multi-value data is the first value, the dither pattern and the predetermined mask pattern are determined in a manner that the arrangement of the dots based on the recording data generated on the basis of the quantized data and the predetermined mask pattern exhibit blue noise characteristics.

10. The image processing apparatus according to claim 7, wherein, in a case where the value indicated by the multi-value data is a second value that is different from the first value, the dither pattern and the predetermined mask pattern are determined in a manner that the arrangement of the dots based on the recording data generated on the basis of the quantized data and the predetermined mask pattern does not exhibit the white noise characteristics.

11. The image processing apparatus according to claim 7, wherein, in a case where the value indicated by the multi-value data is the first value, the dither pattern and a second mask pattern that is different from the predetermined mask pattern among the plurality of mask patterns are determined in a manner that the arrangement of the dots based on the recording data generated on the basis of the quantized data and the second mask pattern does not exhibit the white noise characteristics.

12. The image processing apparatus according to claim 1, further comprising:
    a memory that stores the dither pattern and the plurality of mask patterns.

13. The image processing apparatus according to claim 12,
    wherein the memory further stores a plurality of mask pattern parts including the first part in the each of the plurality of mask patterns and the second part in the each of the plurality of mask patterns, and
    the recording data are generated by using the plurality of mask pattern parts stored in the memory.

14. The image processing apparatus according to claim 12, wherein the plurality of mask patterns stored in the memory are divided to generate the plurality of mask pattern parts and the recording data are generated by using the plurality of generated mask pattern parts.

15. The image processing apparatus according to claim 1, wherein the dither pattern and each of the plurality of mask patterns have a mutually same size.

16. The image processing apparatus according to claim 1, further comprising:
    the recording head.

17. An image processing method for generating recording data used for each of a plurality of relative scanning operations of a recording head in an intersecting direction that intersects with a predetermined direction with respect to a unit area on a recording medium, the recording head including an ejection opening column having a plurality of ejection openings for ejecting ink arranged in the predetermined direction, the recording data specifying ejection or non-ejection of the ink to each of a plurality of pixel areas in the unit area on a recording medium corresponding to a plurality of pixels of the recording data, the image processing method comprising:
    at an image processing apparatus that includes one or more memories configured to store a dither pattern and a plurality of mask patterns corresponding to the plurality of relative scanning operations,
    wherein each pixel area in the dither pattern has a respective threshold value for specifying ejection of ink to a corresponding pixel area on the recording medium,
    wherein each pixel area in each of the plurality of mask patterns has respective information indicating permission or prohibition of ejection of ink to a corresponding pixel area on the recording medium,
    wherein a number of pixel areas of the unit area corresponding to a conveyance amount between two sequential scanning operations is greater than a number of pixel areas in the dither pattern in the predetermined direction, the number of the pixel areas of the unit area corresponding to the conveyance amount being different from an integer multiple of the number of the pixel areas in the dither pattern in the predetermined direction, and
    wherein the number of the pixel areas of the unit area corresponding to the conveyance amount is greater than a number of pixel areas in each of the plurality of mask patterns in the predetermined direction, the number of the pixel areas of the unit area corresponding to the conveyance amount being different from an integer multiple of the number of the pixel areas in the each of the plurality of mask patterns in the predetermined direction;
    obtaining multi-value data corresponding to an image to be recorded in the unit area;
    quantizing the multi-valued data by applying the dither pattern repeatedly in the predetermined direction to generate quantized data, wherein the quantizing the multi-valued data includes (i) generating a first area of the quantized data using a first part in the dither pattern without using a second part in the dither pattern, and (ii) generating a second area of the quantized data using the entire dither pattern, the second area of the quantized data being different from the first area of the quantized data; and
    distributing the quantized data to the plurality of scanning operations by using the plurality of mask patterns to generate the recording data,
    wherein each of the plurality of mask patterns is associated with the dither pattern, and
    wherein the distributing the quantized data includes (i) applying, to the first area of the quantized data, a first part in each of the plurality of mask patterns without using a second part in the each of the plurality of mask patterns, and (ii) applying, to the second area of the quantized data, each of the plurality of mask patterns.

18. The image processing apparatus according to claim 1, wherein the number of the pixel areas of the unit area corresponding to the conveyance amount is different from one over an integer multiple of the number of the pixel areas in the dither pattern in the predetermined direction.

19. The image processing apparatus according to claim 18,
    wherein a second number of pixel areas of the unit area corresponding to a second conveyance amount between two sequential scanning operations is less than the number of the pixel areas of the unit area corresponding to the conveyance amount, and
    wherein the second number of the pixel areas of the unit area corresponding to the second conveyance amount is different from an integer multiple of the number of the pixel areas in the dither pattern in the predetermined direction and is also different from one over an integer multiple of the number of the pixel areas in the dither pattern in the predetermined direction.

20. The image processing apparatus according to claim 19, wherein the conveyance amount is used for conveying the recording medium in a case where the recording head is located in a central part in the predetermined direction on the recording medium, and the second conveyance amount is used for conveying the recording medium in a case where the recording head is located in an end part in the predetermined direction on the recording medium.

* * * * *